United States Patent
Di et al.

(10) Patent No.: US 12,548,977 B2
(45) Date of Patent: Feb. 10, 2026

(54) CONTINUOUS-WAVE PEROVSKITE POLARITON LASER DEVICE AND A LASER CHIP

(71) Applicant: ZHEJIANG UNIVERSITY, Hangzhou (CN)

(72) Inventors: Dawei Di, Hangzhou (CN); Chen Zou, Hangzhou (CN); Baodan Zhao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/239,787

(22) Filed: Jun. 16, 2025

(65) Prior Publication Data
US 2025/0309614 A1 Oct. 2, 2025

Related U.S. Application Data

(63) Continuation of application No. PCT/CN2024/127466, filed on Oct. 25, 2024.

(30) Foreign Application Priority Data

Dec. 18, 2023 (CN) .......................... 202311741014.4

(51) Int. Cl.
*H01S 5/00* (2006.01)
*H01S 5/042* (2006.01)
(Continued)

(52) U.S. Cl.
CPC .......... *H01S 5/1042* (2013.01); *H01S 5/0425* (2013.01); *H01S 5/125* (2013.01);
(Continued)

(58) Field of Classification Search
CPC ...... H01S 5/1042; H01S 5/0425; H01S 5/125; H01S 5/20; H01S 5/04; H01S 5/183
See application file for complete search history.

(56) References Cited

U.S. PATENT DOCUMENTS

| 11,043,792 B2* | 6/2021 | Han | ...................... H10H 20/817 |
| 2020/0076152 A1* | 3/2020 | Eichenholz | .......... G02B 26/125 |
| 2024/0215280 A1* | 6/2024 | Lee | ........................ H10K 85/50 |

FOREIGN PATENT DOCUMENTS

| CN | 102664347 A | 9/2012 |
| CN | 102709808 A | 10/2012 |
| (Continued) | | |

OTHER PUBLICATIONS

Zhou Bolin et al., "Perovskite Photonic Crystal Laser with Low Threshold", Laser & Optoelectronics Progress, vol. 59, No. 5, Mar. 15, 2022, pp. 49-64.

(Continued)

*Primary Examiner* — Kinam Park

(57) ABSTRACT

A continuous-wave perovskite polariton laser device, including an optical microcavity, a spacer layer, and a gain medium. The gain medium is a perovskite material or a composite material containing perovskite, in a form of thin film, microcrystal, phosphor, nanocrystal, quantum dot, or single crystal. The perovskite gain medium is prepared by solution process or vacuum deposition technique, and is combined with an optical resonator. By exploiting the strong interaction between excitons and photons, a steady-state exciton-polariton condensation is formed, enabling the generation of continuous-wave polariton laser emission with a low threshold. The laser device can achieve low-threshold continuous-wave or pulsed lasing emission at room temperature under various light sources pumping or electrical excitation. Its threshold is 1 to 3 orders of magnitude lower than that of conventional semiconductor lasers, with an optimized threshold as low as 0.1 to 1 W/cm$^2$, representing a novel ultralow-power coherent light source technology.

6 Claims, 18 Drawing Sheets

(51) Int. Cl.
- *H01S 5/10* (2021.01)
- *H01S 5/125* (2006.01)
- *H01S 5/20* (2006.01)
- *H01S 5/04* (2006.01)
- *H01S 5/183* (2006.01)

(52) U.S. Cl.
CPC *H01S 5/20* (2013.01); *H01S 5/04* (2013.01); *H01S 5/183* (2013.01)

(56) References Cited

FOREIGN PATENT DOCUMENTS

| CN | 109496378 | A |   | 3/2019  |           |
|----|-----------|---|---|---------|-----------|
| CN | 110474228 | A |   | 11/2019 |           |
| CN | 110504618 | A |   | 11/2019 |           |
| CN | 111129920 | A |   | 5/2020  |           |
| CN | 111446619 | A | * | 7/2020  | H01S 5/36 |
| CN | 111711072 | A | * | 9/2020  | H01S 5/183 |
| CN | 114069383 | A | * | 2/2022  | H01S 5/1046 |
| CN | 114583553 | A | * | 6/2022  | H01S 5/125 |
| CN | 115161025 | A |   | 10/2022 |           |
| CN | 115189233 | A |   | 10/2022 |           |
| CN | 116646823 | A |   | 8/2023  |           |
| CN | 117199994 | A |   | 12/2023 |           |
| CN | 111786260 | B | * | 1/2025  | H01S 5/1075 |
| JP | 2017042748 | A | * | 3/2017 |           |
| WO | WO-2019080925 | A1 | * | 5/2019 | H01S 3/0933 |
| WO | WO-2024229416 | A2 | * | 11/2024 | H01S 5/1042 |

OTHER PUBLICATIONS

Huang Ling et al., "Recent Advances on Amplified Stimulated Emission of Lead Halide Perovskite Micro/Nanostructures", Chinese Journal of Luminescence, vol. 41, No. 12, Dec. 15, 2020, pp. 1479-1489.

* cited by examiner

CONTINUOUS-WAVE PEROVSKITE POLARITON LASER DEVICE AND A LASER CHIP

CROSS REFERENCE TO RELATED APPLICATIONS

This application is a continuation application of international application number PCT/CN2024/127466, filed Oct. 25, 2024, which claims priority to Chinese patent application 202311741014.4, filed on Dec. 18, 2023. The contents of these applications are incorporated herein by reference in their entirety.

TECHNICAL FIELD

The present disclosure relates to the technical field of optoelectronic device technology, in particular to a low threshold perovskite polariton laser device and a laser chip capable of operating in continuous-wave pumping mode.

BACKGROUND

When the coupling strength between excitons in a semiconductor and cavity photons confined by an optical microcavity exceeds the decay rates of the excitons and cavity photons, a hybrid quasi-particle known as an exciton-polariton can form. This polariton is created through the interaction between excitons and photons and manifests as a hybrid state that is part light and part matter. As the density reaches a certain level, the polariton undergoes scattering interactions, releasing phonons, and they condense into the lowest quantum energy state. Simultaneously, the photon component leaks out of the optical microcavity, resulting in polariton laser. Compared to traditional semiconductor lasers, polariton lasers do not require population inversion to operate, making their threshold theoretically 1 to 2 orders of magnitude lower than those of photon lasers, which is more favorable for continuous-wave (CW) laser generation.

In the selection of the gain medium for polariton laser, inorganic semiconductors generally have a high dielectric constant and a low effective hole mass, resulting in small exciton binding energies, typically less than or around 10 meV. At room temperature, these excitons easily dissociate into free electron-hole pairs, which means that exciton-polariton condensation can typically only be observed at lower temperatures, such as around 10K for GaAs and CdTe. This temperature requirement significantly limits the development and application of exciton-polaritons. In contrast, organic materials predominantly host Frenkel excitons, which have weak dielectric screening, resulting in much larger exciton binding energies, usually in the range of hundreds of meV These materials also exhibit higher oscillator strengths, which allows for the observation of exciton-polariton condensation at higher critical temperatures. However, the weaker nonlinear effects and structural inhomogeneities in organic materials limit the spatial extent and lifetime of exciton-polaritons. The weak Coulomb interactions between localized Frenkel excitons reduce the scattering between polaritons, thus delaying the condensation of exciton-polaritons. As a result, polariton lasers in organic materials often have higher thresholds, sometimes even exceeding the threshold of stimulated emission lasers that rely on population inversion.

Metal halide perovskites exhibit excellent optoelectronic properties and can be prepared via solution processing with low crystallization temperatures. They are easy to process and cost-effective, making them one of the most promising materials for light emission and energy conversion, with widespread applications in LEDs and solar cells. However, the attention given to perovskite lasers, especially in the context of polariton lasers, is still relatively low. Notably, perovskites possess high light absorption coefficients, long carrier diffusion lengths, low non-radiative recombination rates, high defect tolerance, and tunable emission wavelengths. Perovskite materials also typically have exciton binding energies greater than the thermal energy at room temperature and high exciton concentrations. These properties make perovskite materials promising for polariton laser applications, positioning them as potential materials for studying light-matter interactions.

Although previous studies have reported perovskite polariton lasers, these lasers were generated under pulsed light pumping conditions. Continuous-wave (CW) pumping perovskite lasers is an essential step toward electrically pumped perovskite lasers. Therefore, how to achieve continuous-wave perovskite polariton lasers is an important technical challenge.

SUMMARY

In response to the limitations of existing technologies, the present disclosure proposes a continuous-wave perovskite polariton laser device and a laser chip, along with a production method. By introducing the perovskite gain medium into an optical microcavity, the disclosure promotes a strong coupling between excitons and photons. Furthermore, by adjusting the detuning between the cavity mode and the polariton mode, the exciton polariton properties are controlled, enabling the microcavity to generate laser emission under continuous-wave pumping. This results in an ultra-low threshold coherent light source.

The continuous-wave perovskite polariton laser device, including an optical microcavity, a spacer layer, and a gain medium, the gain medium is uniformly distributed within the microcavity.

Furthermore, the gain medium is a perovskite material or a composite material containing perovskite, in a form of thin film, microcrystal, phosphor, nanocrystal, quantum dot, or single crystal, with a thickness ranging from 10 nm to 1 mm.

Furthermore, a component of the perovskite material is $A'_2A_{n-1}B_nX_{3n+1}$ or $ABX_3$, wherein A' is organic amine ion, A is monovalent cation, B is divalent metal cation, and X is anion, n is a positive integer.

Furthermore, A' is consisted of one or more of phenylethylamine ($PEA^+$), butylamine ($BA^+$), and ethylamine ($EA^+$); A is consisted of one or more of cesium ion ($Cs^+$), methylammonium ion ($MA^+$), formamidinium ion ($FA^+$), ethylamine ion ($EA^+$), guanidinium ion ($GA^+$), and isopropylamine ion ($IPA^+$); B is consisted of one or more of lead ion ($Pb^{2+}$), tin ion ($Sn^{2+}$), germanium ion ($Ge^{2+}$), indium ion ($In^{2+}$), and bismuth ion ($Bi^{2+}$); and X comprises one or more of chloride ion ($Cl^-$), bromide ion ($Br^-$), and iodide ion ($I^-$).

Furthermore, the composite material includes perovskite material, as well as one or more of organic material, quantum dot material, oxide material, group III-V material, group II-VI material, and rare earth material.

Furthermore, the optical microcavity type is a distributed bragg reflector (DBR), a distributed feedback bragg grating (DFB), a photonic crystal (PC), a bound state in the continuum (BIC) structure, or a whispering gallery mode (WGM).

The present disclosure also provides a continuous-wave perovskite polariton laser chip, including an optical microcavity, an electrically driven light source, and a power supply; the optical microcavity is fixed to the electrically driven light source; the electrically driven light source is served as a pump of the optical microcavity; and the power supply being connected to the electrically driven light source.

Furthermore, the optical microcavity is fixed to the electrically driven light source by bonding, gluing, welding, coating, or photolithography, with the electrically driven light source serving as the pump for the optical microcavity.

The present disclosure also provides a preparation method of a continuous-wave perovskite polariton laser device, including: S1, preparing the optical microcavity; S2, preparing the perovskite material; and S3, preparing the perovskite laser device.

Furthermore, S2 includes: dissolving A'X, AX, $BX_2$ and molecular additive in a solvent to obtain a perovskite precursor solution; and preparing the perovskite material by solution process.

Furthermore, S3 includes: injecting the perovskite precursor solution into the optical microcavity; placing the optical microcavity with the perovskite precursor solution on a heating platform to induce a crystallization of a perovskite single crystal during a heating process, allowing in-situ growth of the perovskite single crystal, and obtaining the continuous-wave perovskite polariton laser device.

Furthermore, S1 also includes: depositing multilayer dielectric layers of silica/titanium dioxide ($SiO_2/TiO_2$) on a quartz, a sapphire, or a flexible polyethylene terephthalate (PET) substrate by sputtering or electron-beam evaporation to form the DBR mirror; wherein a thickness of each dielectric layer is $\lambda/4n$, where X is an emission wavelength of the gain medium, and n is a refractive index of the dielectric material.

Furthermore, S1 includes the following steps: depositing a metal pillar array on a distributed bragg reflector (DBR) mirror, with a height of each metal pillar ranging from 10 nm to 1 mm; placing another DBR mirror facing down and bonded to the DBR with the metal pillar array; applying a pressure to press them together to form a vertical microcavity surface-emitting laser (VCSEL) structure.

Furthermore, a perovskite thin film is obtained by a spin coating method.

Furthermore, the solvent in S2 is consisted of one or more of dimethyl fumarate (DMF), dimethyl sulfoxide (DMSO), gamma-butyrolactone (GBL), and dimethyl adipate (DMA).

Furthermore, the molecular additive is consisted of one or more of polymer, small molecule, or oxide.

Furthermore, the polymer is polymethyl methacrylate (PMMA), polyethylene glycol (PEG), poly (ethylene oxide) (PEO), or polyvinylpyrrolidone (PVP); the small molecule is potassium bromide (KBr), potassium thiocyanate (KSCN), or guanidine thiocyanate (GASCN); and the oxide is NiOx, ZnO, or $SnO_2$.

The preparation method of the continuous-wave perovskite polariton laser chip involves UV epoxy resin, the perovskite microcavity is directly attached to a commercial gallium nitride (GaN) light emitting diode (LED), forming a perovskite laser chip. The GaN LED is acted as a pump for the perovskite microcavity, driven by a power supply.

The present disclosure has the following beneficial effects.

(1) Cost-effective in preparation of high-quality perovskite gain medium. This preparation method uses solution-based and other low-cost techniques to prepare high-quality perovskite gain medium. By optimizing the interface, the quality of the perovskite material is improved, effectively suppressing grain boundary defects and photon scattering losses in the perovskite thin film, thus reducing the internal losses in laser devices.

(1) Low threshold and efficient coupling. By combining high-quality optical microcavity and the method promotes strong coupling between excitons and photons, obtaining perovskite polariton laser device with an extremely low threshold. Laser beams can be emitted under very low pump power conditions. The threshold is 1 to 3 orders of magnitude lower than that of traditional semiconductor lasers. The unoptimized laser threshold can reach 1 to 10 $W/cm^2$ or below, and after optimization, it can be as low as 0.1 to 1 $\mu J/cm^2$ or below. Under pulsed optical pumping, the unoptimized laser threshold can be as low as 1 $\mu J/cm^2$ or below, and after optimization, it can reach 0.1 $\mu J/cm^2$ or below.

(3) Exciton-photon interaction enhancement. This method achieves oscillation feedback through the optical microcavity, promoting strong interactions between excitons and photons in the perovskite material. By adjusting the thickness of the gain medium, the microscopic properties of exciton polaritons in the optical microcavity can be controlled, enhancing their tendency to condense into the ground state. Under continuous-wave pumping, laser emission can be achieved, with exciton lifetimes ranging from 1 ps to 100 ms.

(4) Integration with various light sources. The perovskite laser devive can be combined with various incoherent or coherent light sources (such as commercial III-V light-emitting diode (LED), organic light-emitting diod (OLED), quantum dot LED (QD-LED), perovskite light-emitting diode (PeLED), micro-LEDs, laser diode (LD), halogen tungsten lamps, etc.) to construct electrically pumped perovskite laser chip.

(5) Excellent coherence and polarization properties. The laser device exhibits good temporal and spatial coherence, as well as excellent polarization characteristics. These properties make the laser device suitable for further applications in low-threshold coherent light sources, slow light devices, quantum computing, optical computing, photonic chips, optoelectronic integration, and other fields.

DETAILED DESCRIPTION OF THE EMBODIMENTS

Figure 1A:
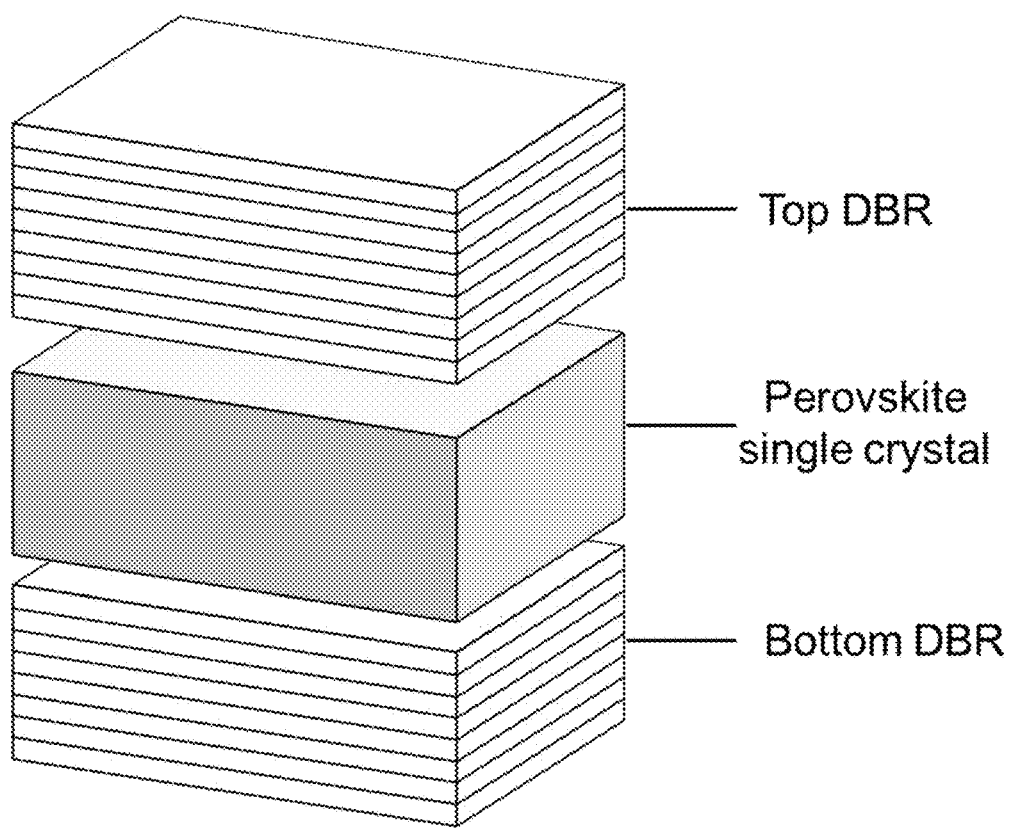
FIG. 1A is a schematic of a continuous-wave perovskite polariton laser device.

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

Further explanation and clarification of the present disclosure will be provided in conjunction with the accompanying drawings.

A first embodiment discloses a preparation method of a continuous-wave perovskite polariton laser device, includes the following steps of S1 to S3.

S1, Preparing the optical microcavity. Specifically, S1 includes S11 to S14.

S11, Depositing multilayer dielectric layers of silica/titanium dioxide ($SiO_2/TiO_2$) on a quartz by sputtering method to form the DBR mirror with high reflectivity (>98%) at 550 nm; a thickness of $SiO_2$ layer is 91 nm, a thickness of $TiO_2$ layer is 55 nm.

S12, Depositing a periodicity metal pillar array on a distributed bragg reflector (DBR) mirror by hot evaporation method; a diameter of each metal pillar is 1 mm, and a distance between two adjacent metal pillars is 1 mm.

S13, Coating a layer of PMMA on the DBR mirror in a spin-coating manner, to enhance surface hydrophobicity; a concentration of PMMA solution is 5 mg/ml, a rotating speed is 3000 rpm, and after spin-coating process, it is heated at 120° C. for 10 minutes on a hot bench for curing.

S14, Placing another DBR mirror facing down and bonded to the DBR mirror of S13 with the metal pillar array; fixing with clips to form a vertical microcavity structure.

S2, Preparing the perovskite material; and S2 includes S21 to S22.

S21, Dissolving FABr:MABr:$PbBr_2$ with a molar ration of 0.1:0.9:1 in 1 mL of DMF and DMSO mixed solvent to obtain a perovskite precursor solution; and a concentration of the precursor solution is 1 mol L$^{-1}$, a ratio of DMF to DMSO is 4:1.

S22, Adding 5 mg of molecular additive PVP to the perovskite perovskite precursor solution for passivating defects.

S3, Preparing the perovskite laser device. Specifically, S3 includes S31 to S32.

S31, injecting the perovskite precursor solution into the optical microcavity; By utilizing capillary forces, the perovskite precursor solution will diffuse uniformly within the optical microcavity.

S32, Placing the optical microcavity with the perovskite precursor solution on a heating platform to induce a crystallization of a perovskite single crystal during a heating process. Slowly increase the temperature from 30° C. to 80° C. at a rate of 2° C. per hour. After reaching 80° C., continuously heating for 24 hours. After the hot stage temperature gradually cools down to room temperature, taking the optical microcavity out from the heater, and obtaining the continuous-wave perovskite polariton laser device.

S4, Examining and testing the continuous-wave perovskite polariton laser device.

Placing the continuous-wave perovskite polariton laser device on an inverted microscope stage, and a continuous-wave laser (405 nm wavelength) is focused onto the gain medium layer of the perovskite polariton laser device, using a 100× objective lens; placing a rotary attenuation filter in a front of the objective lens to adjust the excitation intensity.

Controlling the continuous-wave perovskite polariton laser device to emit laser beam, the laser beam generated by the continuous-wave perovskite polariton laser device passes through the microscope objective and then through a 4f system, and then directing the laser beam into a slit entrance of an imaging spectrometer to measure its angle-resolved spectrum.

Placing a polarizer in front of the imaging spectrometer, and the angle of the polarizer is rotated to measure a polarization of the laser beam.

Adopting a beam splitter to split the laser beam from the continuous-wave perovskite polariton laser device into two paths; and directing each path into a fiber-coupled single-photon detector to measure a temporal and a spatial coherence of the laser beam.

Figure 1B:
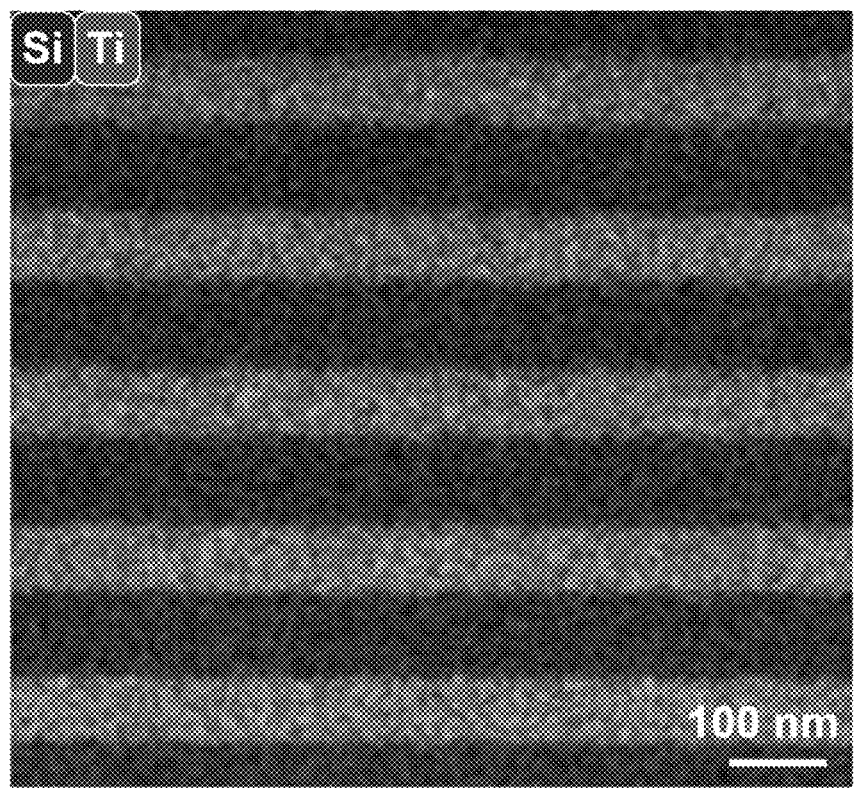
FIG. 1B is a scanning transmission electron microscope (STEM) and energy-dispersive X-ray spectroscopy (EDS) images of the DBR structure.
Figure 1C:
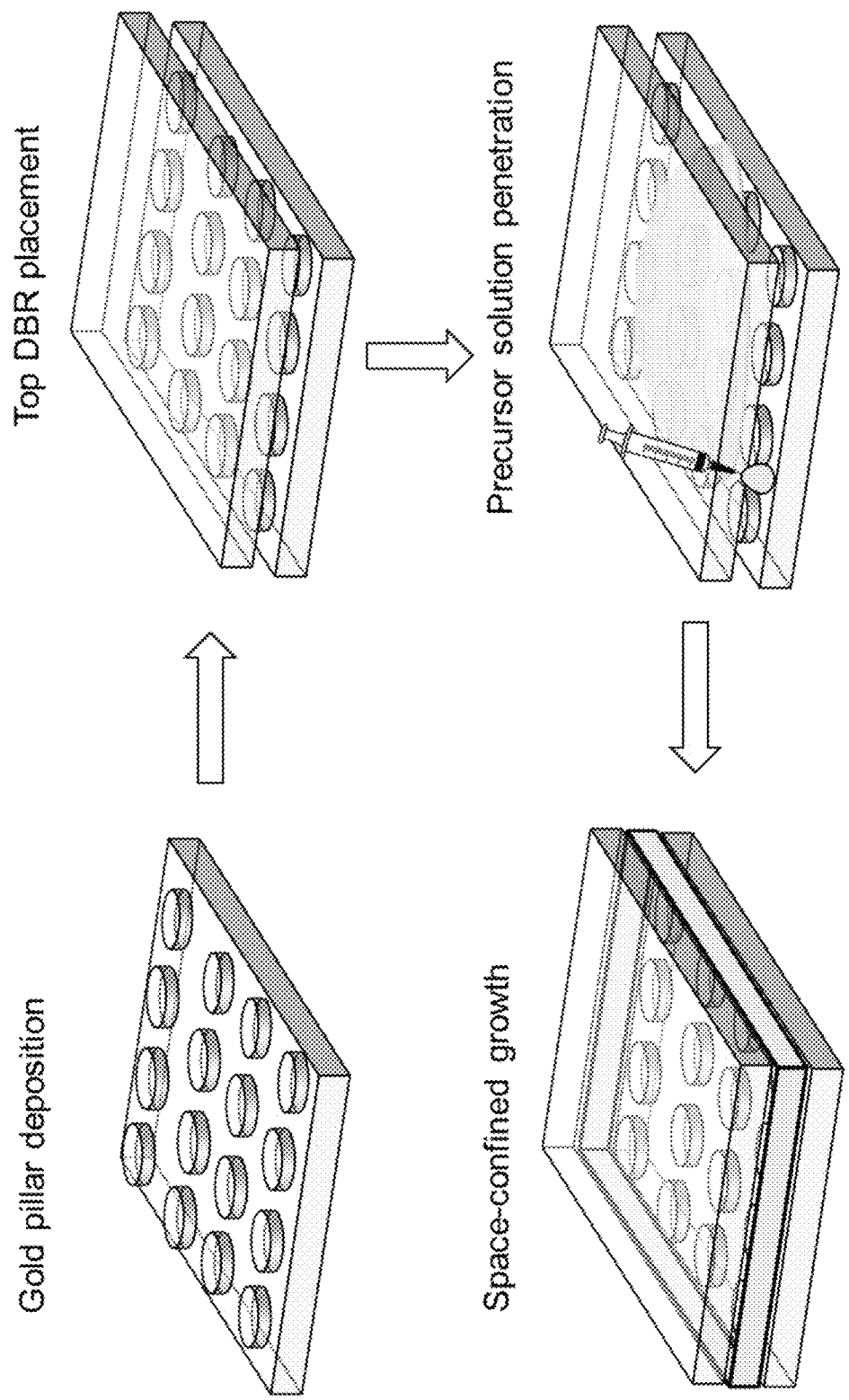
FIG. 1C is a process flow diagram for a preparation of a single crystal perovskite microcavity.
Figure 1D:
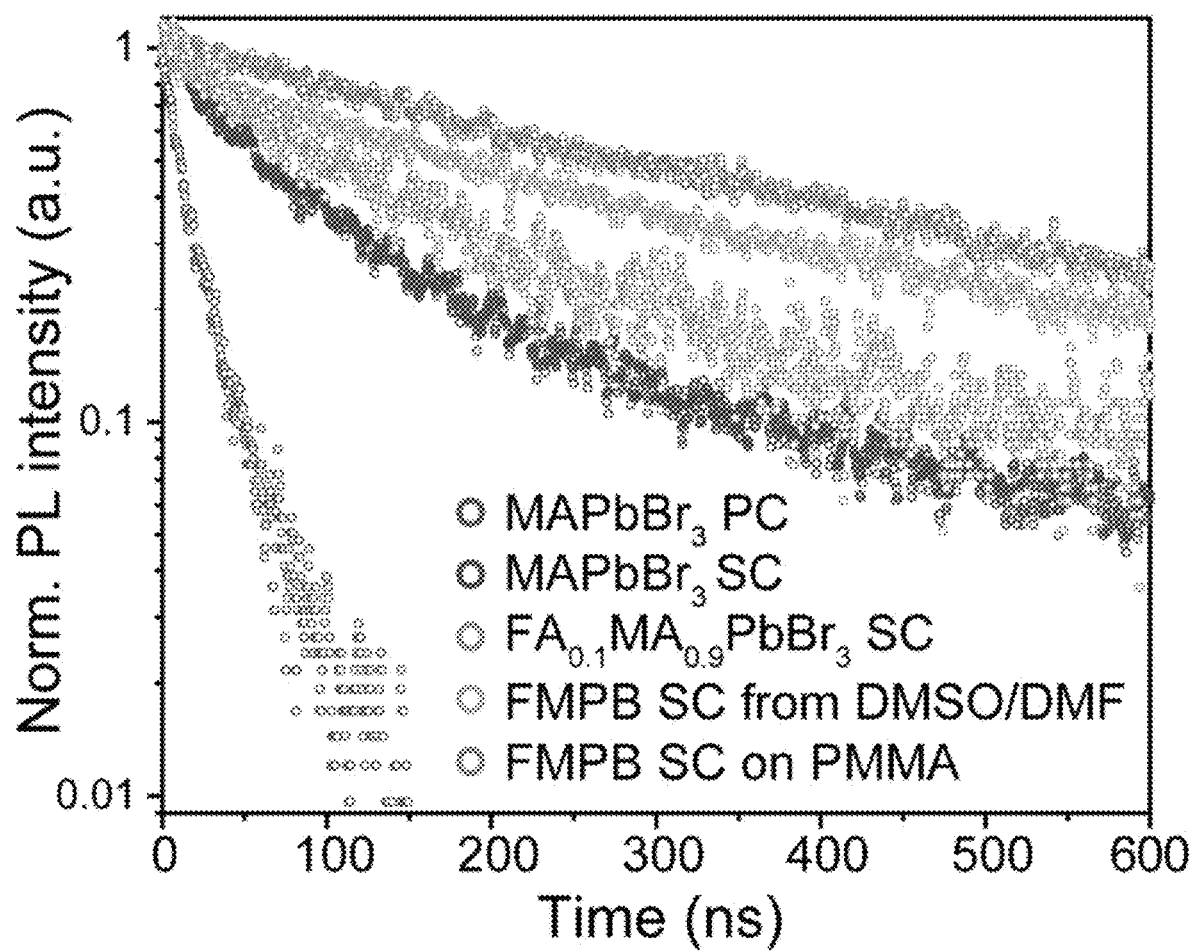
FIG. 1D is a scanning electron microscope (SEM) image of $MAPbBr_3$ perovskite single crystal.
Figure 1E:
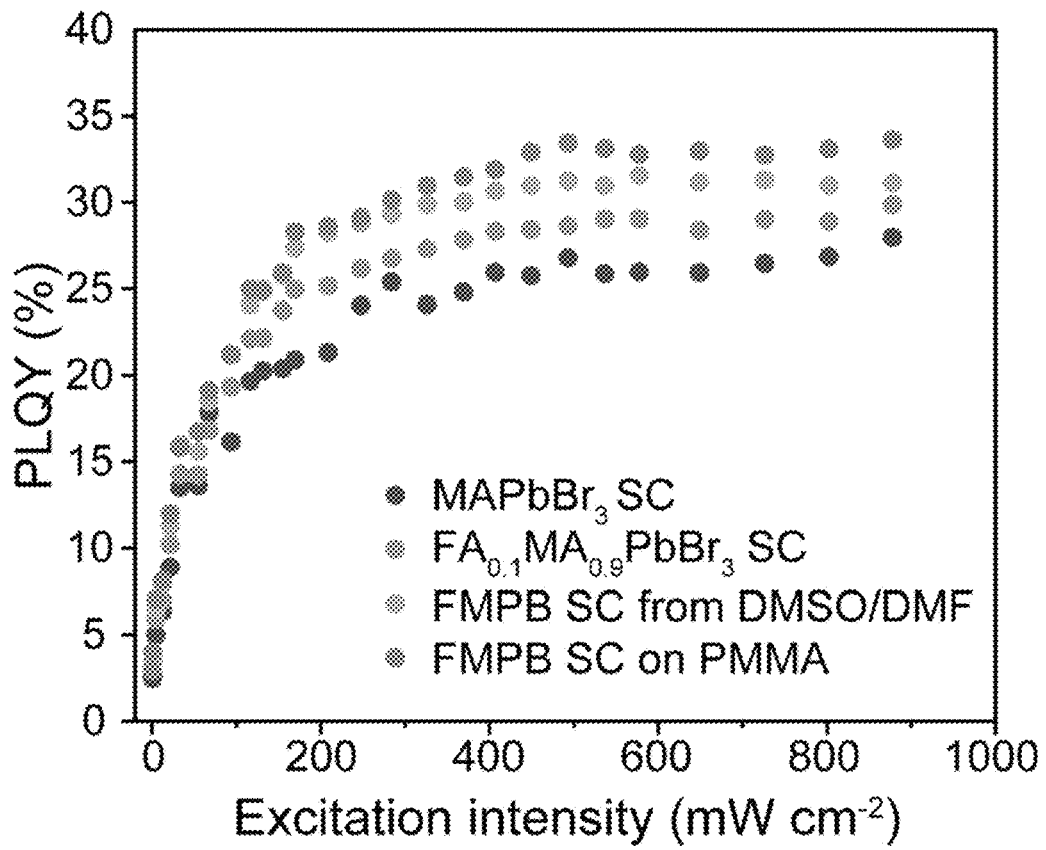
FIG. 1E is a fluorescence microscopy image of $MAPbBr_3$ perovskite single crystal.
Figure 1F:
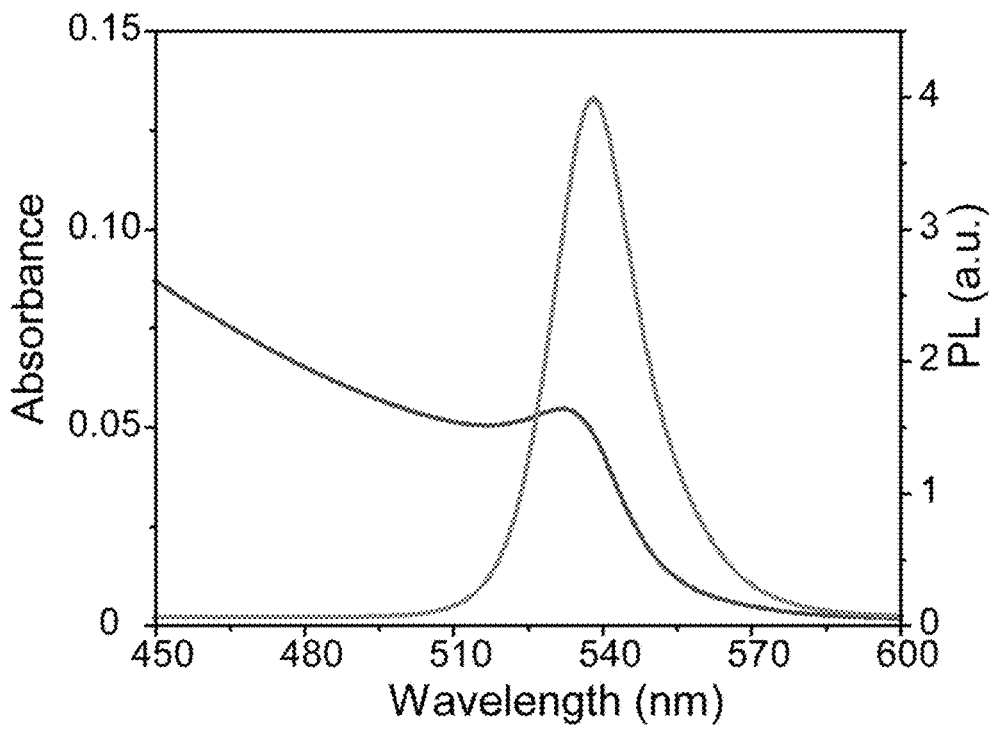
FIG. 1F is a X-ray diffraction (XRD) spectra of $MAPbBr_3$ single crystal and polycrystalline sample.
Figure 1G:
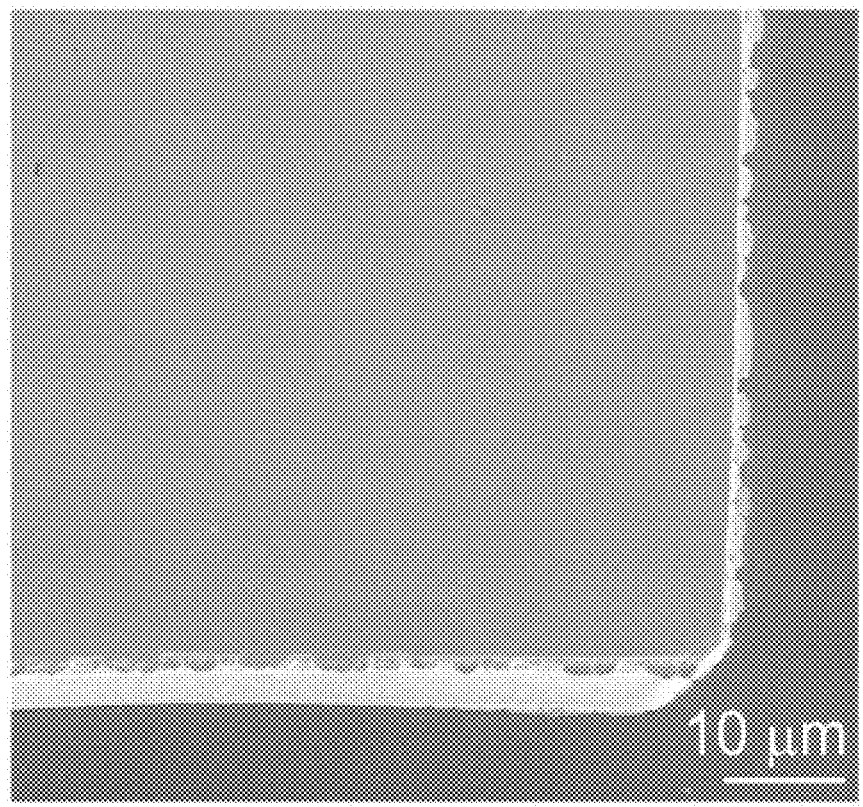
FIG. 1G is an absorption and photoluminescence (PL) spectra of $MAPbBr_3$ perovskite single crystal.
Figure 1H:
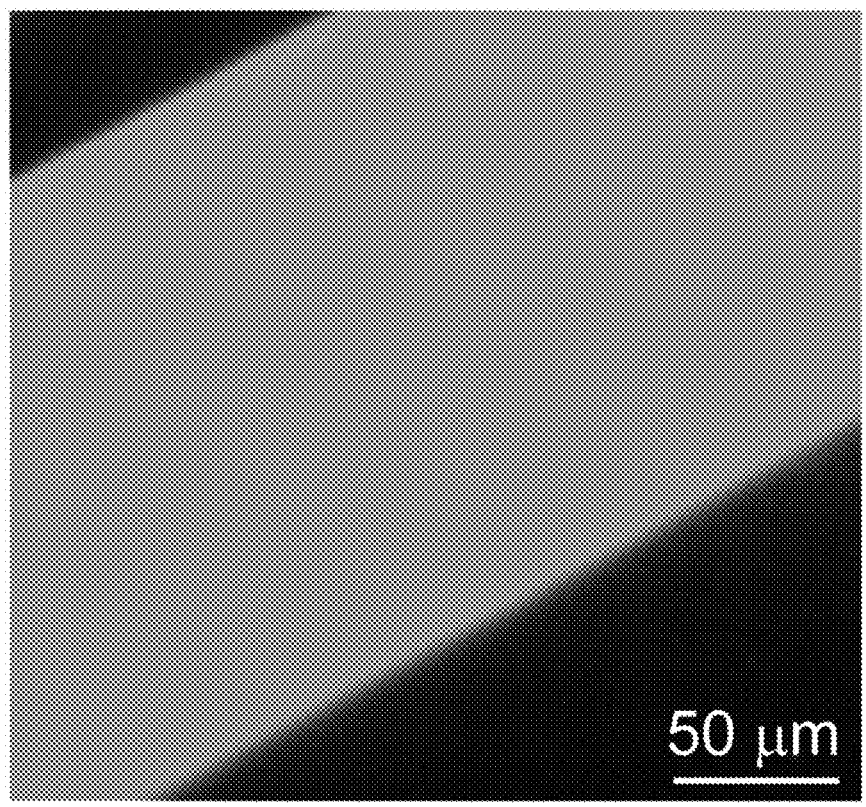
FIG. 1H is a transient PL decay curve of the perovskite sample (excitation wavelength is 400 nm; excitation intensity is 4.2 $\mu J\ cm^{-2}$).
Figure 1I:
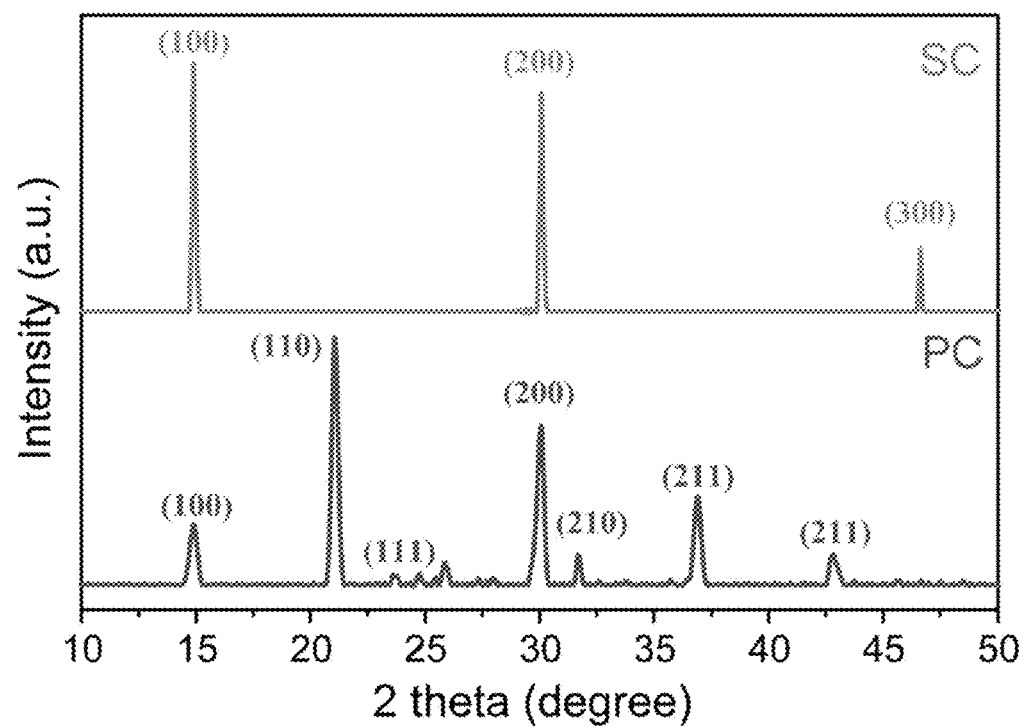
FIG. 1I is a photoluminescence quantum yield (PLQY) of different perovskite samples as a function of excitation intensity.

FIGS. 1A to 1I show preparation and material characterization of perovskite polariton laser. FIG. 1A is a schematic of a continuous-wave perovskite polariton laser device. FIG. 1A shows the perovskite single crystal is sandwiched between a top DBR and a bottom DBR, and continuous-wave laser emission is achieved through the interaction between excitons and photons. FIG. 1B is a scanning transmission electron microscope (STEM) and energy-dispersive X-ray spectroscopy (EDS) images of the DBR structure, showing multiple dielectric layers of $SiO_2/TiO_2$. FIG. 1C is a process flow diagram for a preparation of a single crystal perovskite microcavity. FIG. 1D is a scanning electron microscope (SEM) image of $MAPbBr_3$ perovskite single crystal; which shows the perovskite dielectric layer is very smooth, with no grain boundaries, which results in minimal photon scattering losses. FIG. 1E is a fluorescence microscopy image of $MAPbBr_3$ perovskite single crystal; which shows the photoluminescence distribution is uniform, with no obvious defects. FIG. 1F is a X-ray diffraction (XRD) spectra of $MAPbBr_3$ single crystal and polycrystalline sample, and the single crystal XRD shows fewer impurity peaks, with sharper and narrower peaks, indicating higher phase purity of the single crystal perovskite. FIG. 1G is absorption and photoluminescence spectra of $MAPbBr_3$ perovskite single crystal. FIG. 1H is a transient PL decay curve of the perovskite sample (excitation wavelength is 400 nm; excitation fluence is 4.2 $\mu J\ cm^{-2}$), wherein FMPB is an abbreviation for $FA_{0.1}MA_{0.9}PbBr_3$ perovskite. FIG. 1I is a photoluminescence quantum yield (PLQY) of different perovskite samples as a function of excitation intensity, which shows that by strategies such as A-site cation regulation, mixed solvents, molecular additive passivation, and surface hydrophobicity regulation, the final $FA_{0.1}MA_{0.9}PbBr_3$ perovskite sample exhibits longer fluorescence lifetime (420 ns) and higher PLQY (>30%)

Figure 2A:
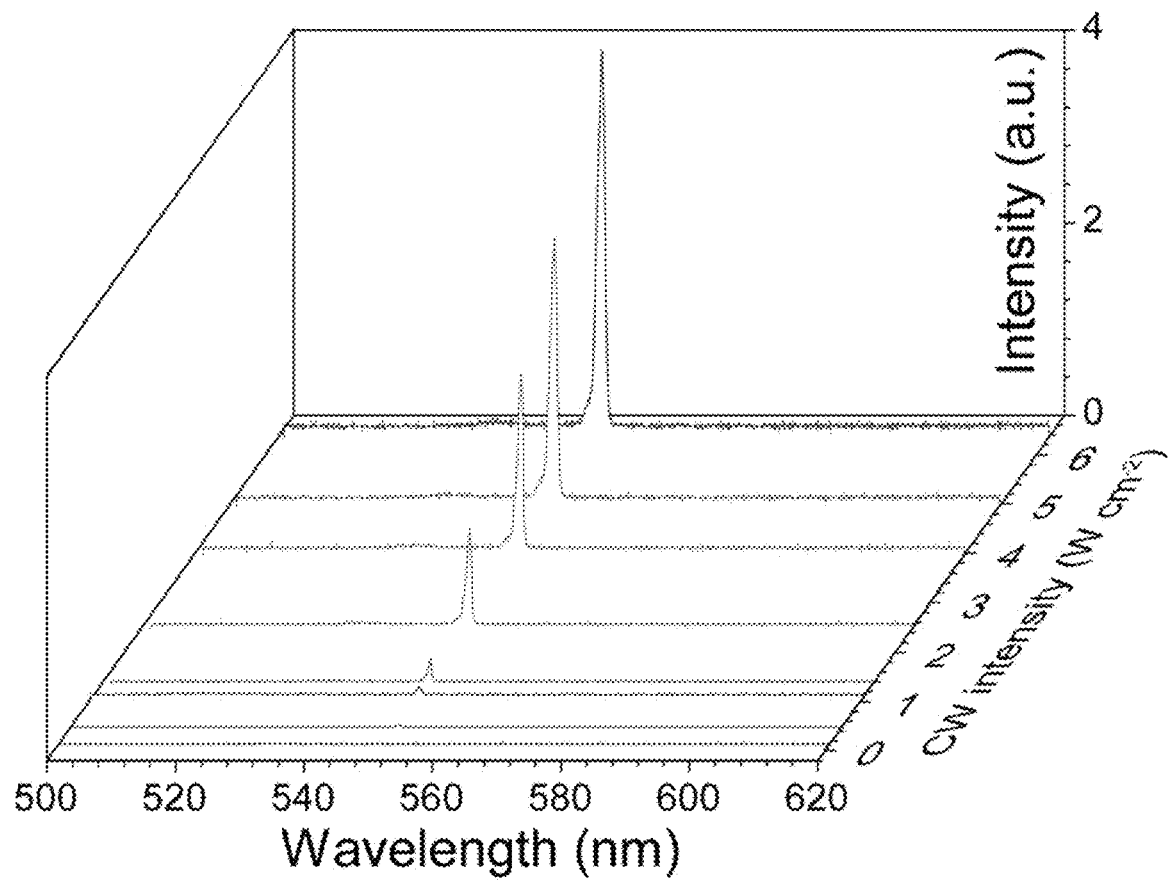
FIG. 2A is an evolution of the emission spectrum under different continuous-wave pump intensities.
Figure 2B:
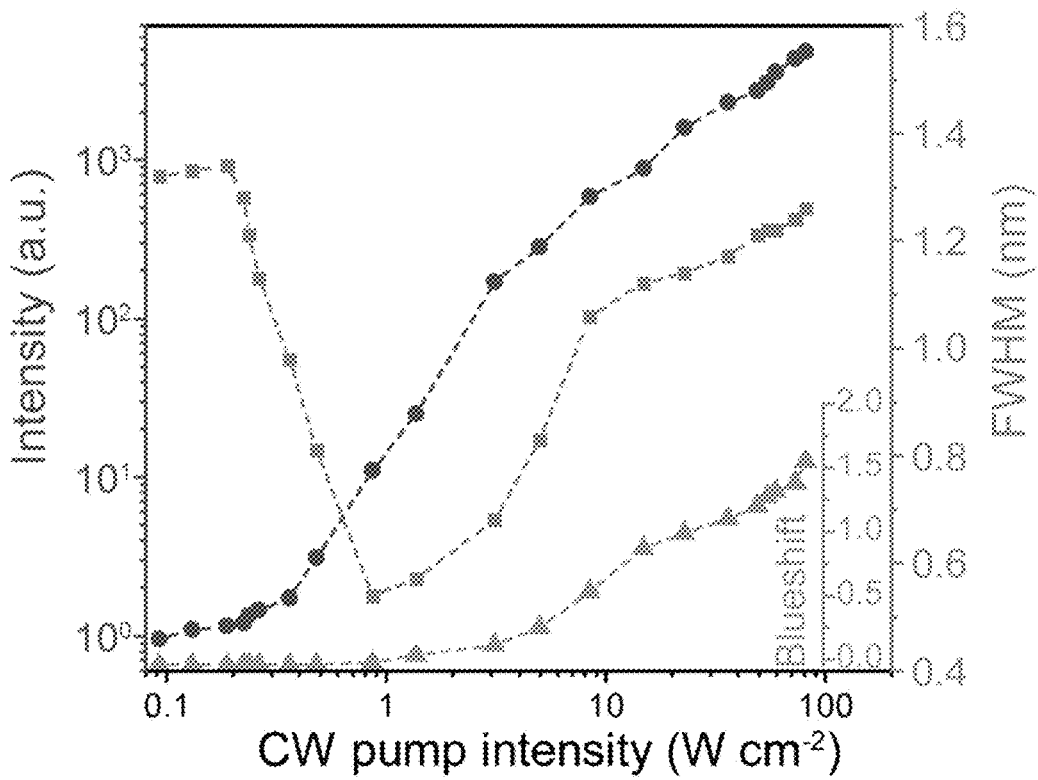
FIG. 2B is a dependence of light output intensity and spectral full width at half maximum (FWHM) on continuous pump intensity.
Figure 2C:
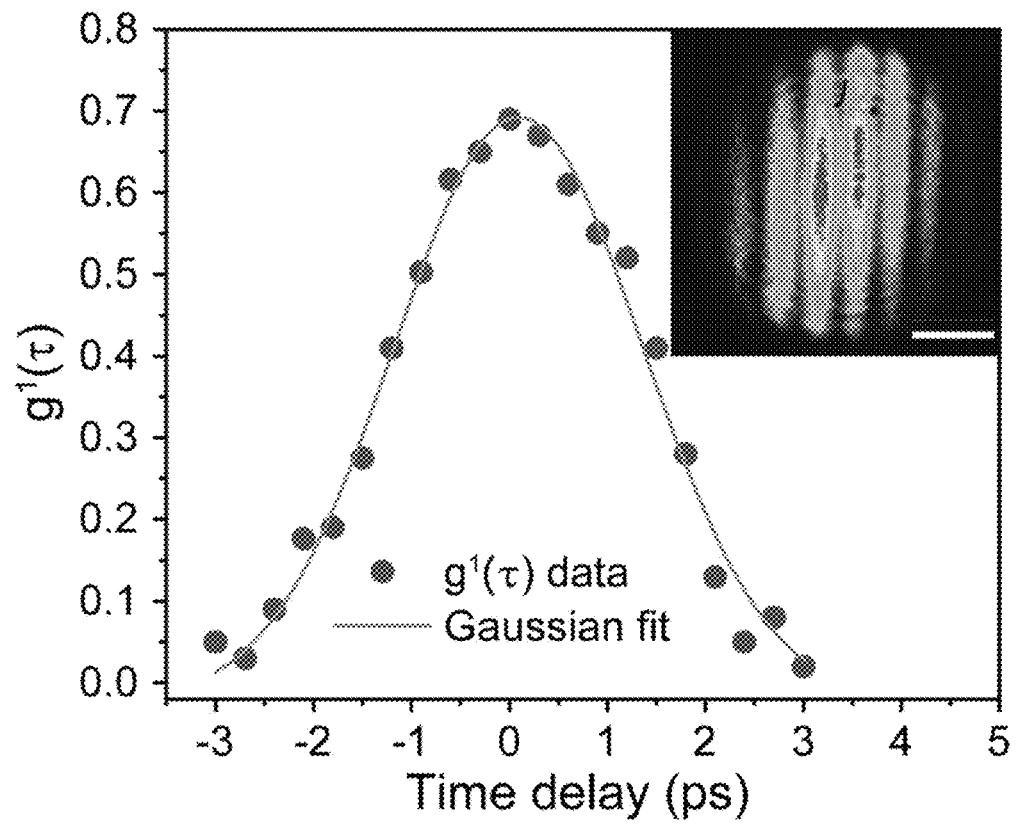
FIG. 2C is a temporal coherence of the continuous-wave exciton laser.
Figure 2D:
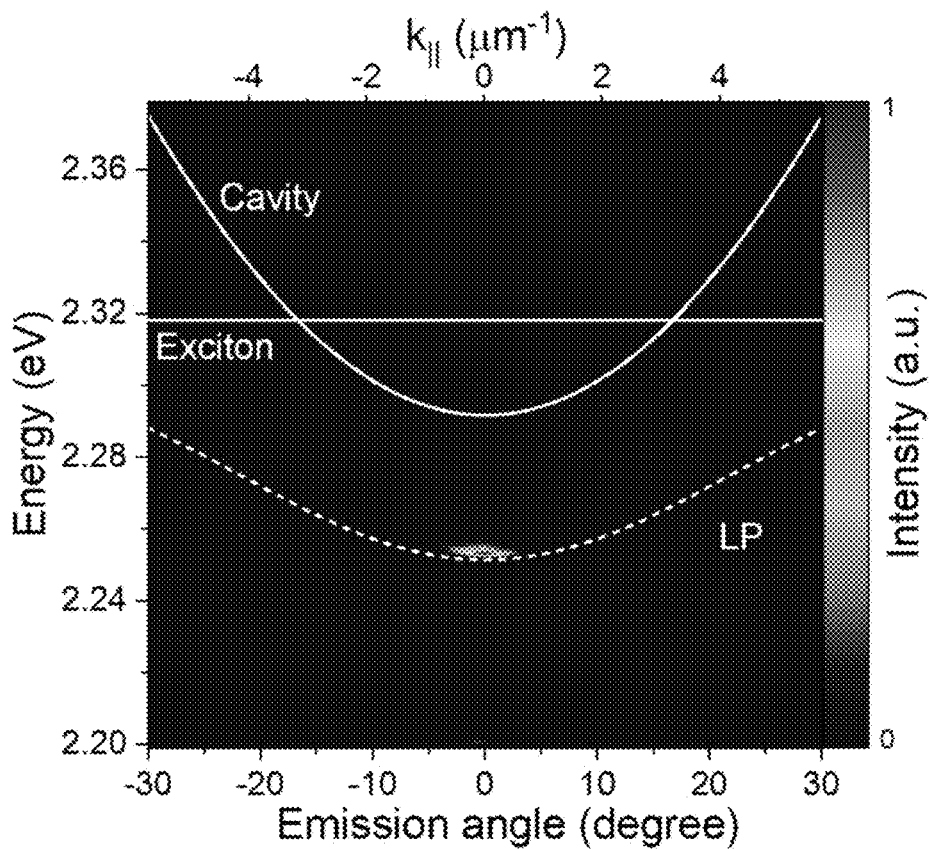
FIG. 2D is an angle-resolved PL spectra above the laser threshold of 3.2 $P_{th}$.
Figure 2E:
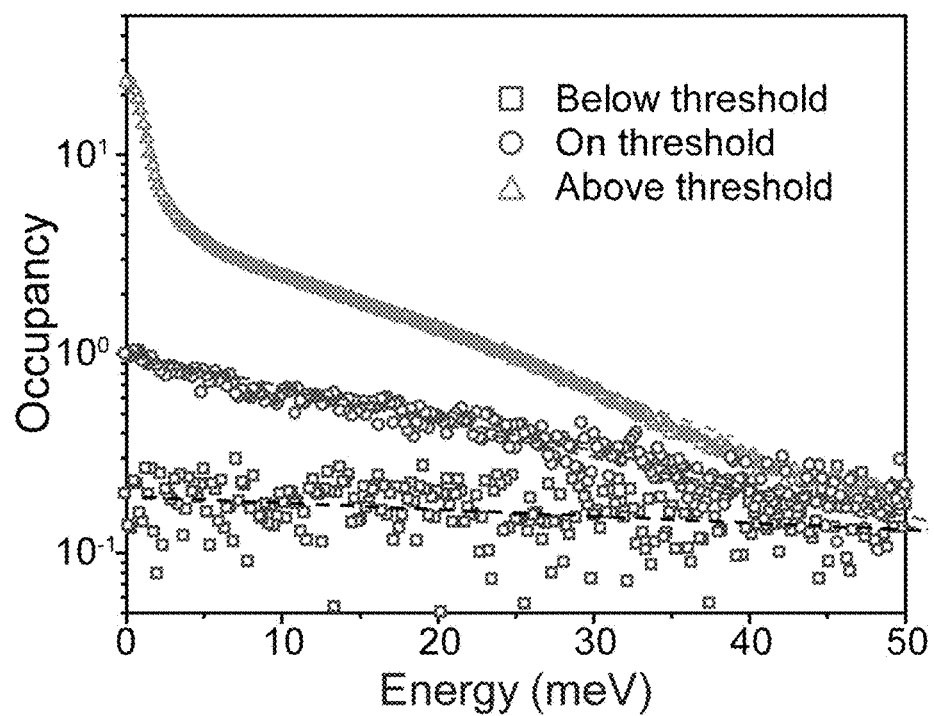
FIG. 2E is occupancy distribution curves of polaritons in various energy states at pump intensities below $0.8P_{th}$, around $1.0P_{th}$, and above $2.0P_{th}$, plotted on a semi-log scale.
Figure 2F:
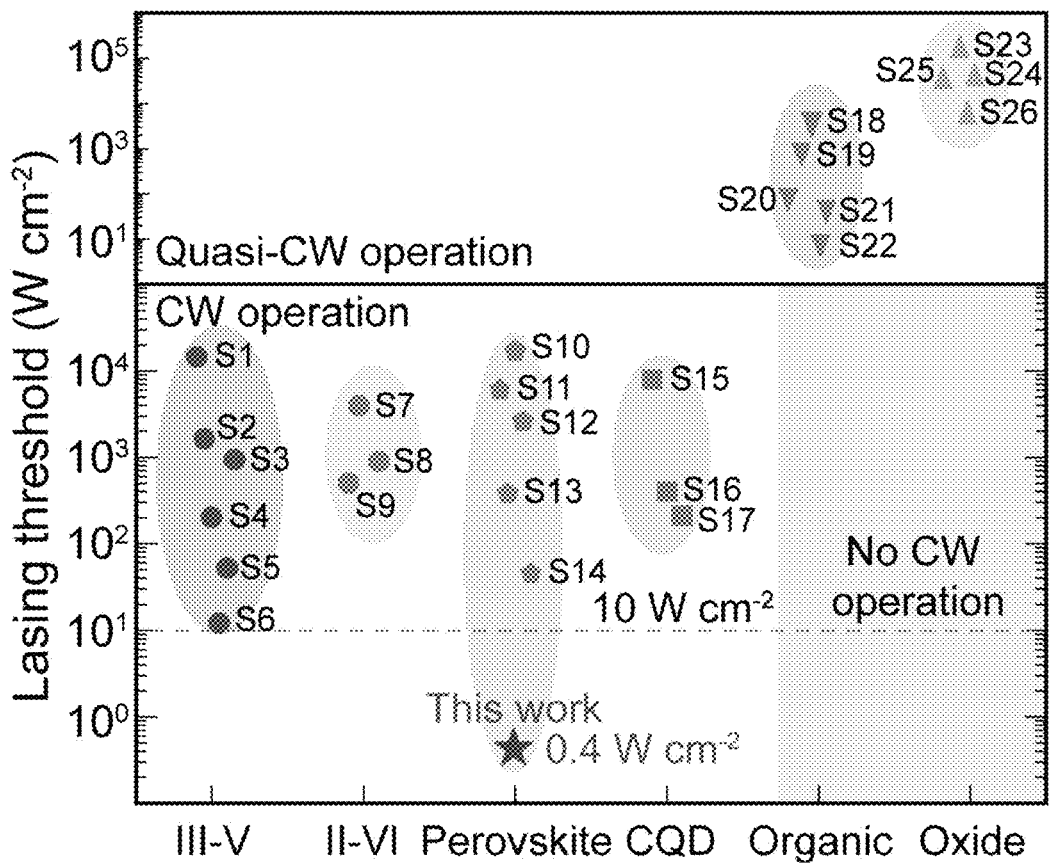
FIG. 2F is a comparison of lasing thresholds for continuous-wave lasers based on different types of semiconductor materials.

FIGS. 2A to 2F shows the continuous-wave polariton laser in a single crystal perovskite microcavity at room temperature. FIG. 2A is an evolution of the emission spectrum under different continuous-wave pump intensities, the inset shows near-field emission images for pump intensities below (left), near (middle), and above (right) the threshold, and the scale bar is 20 $\mu m$. FIG. 2B is a variation of light output intensity and spectral full width at half maximum (FWHM) with continuous-wave (CW) pump intensity, with a pump spot diameter of 18 $\mu m$. FIG. 2C is a temporal-spatial coherence of the continuous-wave exciton laser; in a condition of above a threshold, a first-order coherence g(t) was measured using a Michelson interferometer; the solid line represents a Gaussian fit to the data, and the inset shows a Michelson interference pattern at zero delay. FIG. 2D is an angle-resolved PL spectra above the lasing threshold of 3.2 $P_{th}$; the straight line represents the exciton dispersion relation, while the solid parabolic curve represents the cavity photon dispersion relation, and the dashed line represents the dispersion curve for the lower polariton branch; in a condition of above the laser threshold, polaritons condense at a bottom of a lower branch to generate polariton laser. FIG. 2E is an occupancy distribution curves of polaritons in various energy states at pump intensities below $0.8P_{th}$, around $1.0P_{th}$, and above $2.0P_{th}$, plotted on a semi-log scale; for each pump intensity, the zero point of the energy scale corresponds to the ground state energy for the spatial plane-wave vector $k_{//}=0$, with the horizontal axis showing energy shifts relative to $k_{//}=0$; and the density of states for the ground state polariton is set to 1. The dashed line represents the Maxwell-Boltzmann distribution function at room temperature, which matches well with the polariton occupancy distribution curve at the threshold, proving Bose-Einstein condensation. FIG. 2F is a comparison of continuous-wave laser thresholds for lasers based on different types of semiconductor materials, which shows that the threshold for the perovskite polariton laser we achieved is 27 times lower than that of traditional III-V semiconductors, reaching 1 to 2 orders of magnitude lower.

Figure 3A:
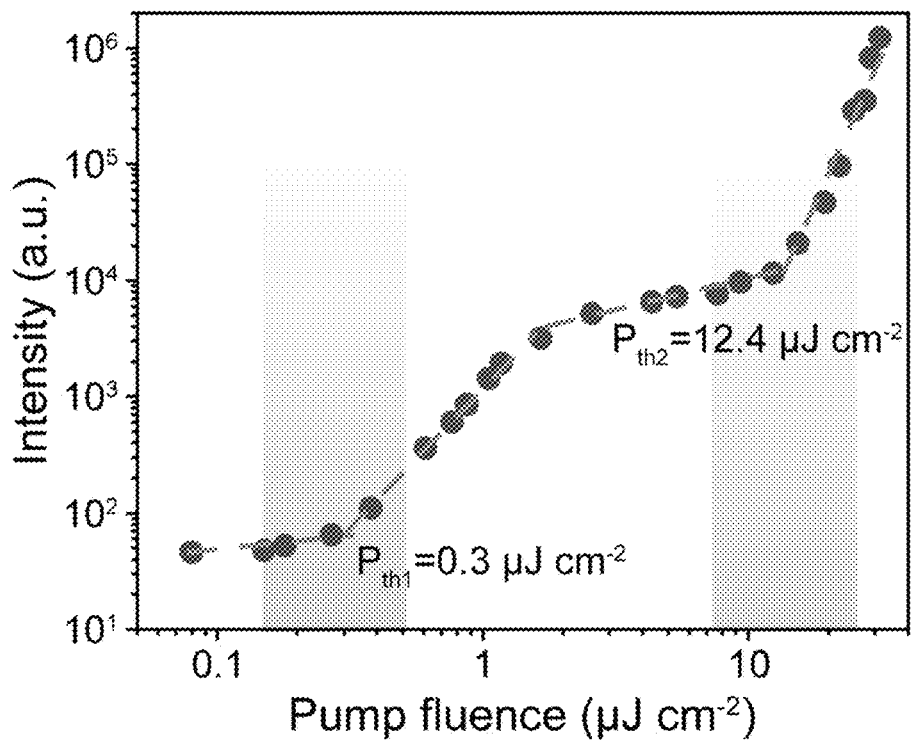
FIG. 3A is a curve of emission intensity vs. pump fluence for the single crystal perovskite microcavity; at pump fluences of 0.3 µJ cm$^{-2}$ and 12.4 µJ cm$^{-2}$ corresponding to polariton lasing and photon lasing, respectively; and the sample was pumped using a 400 nm fs laser source (pulse width is 270 fs, repetition rate is 50 kHz).
Figure 3B:
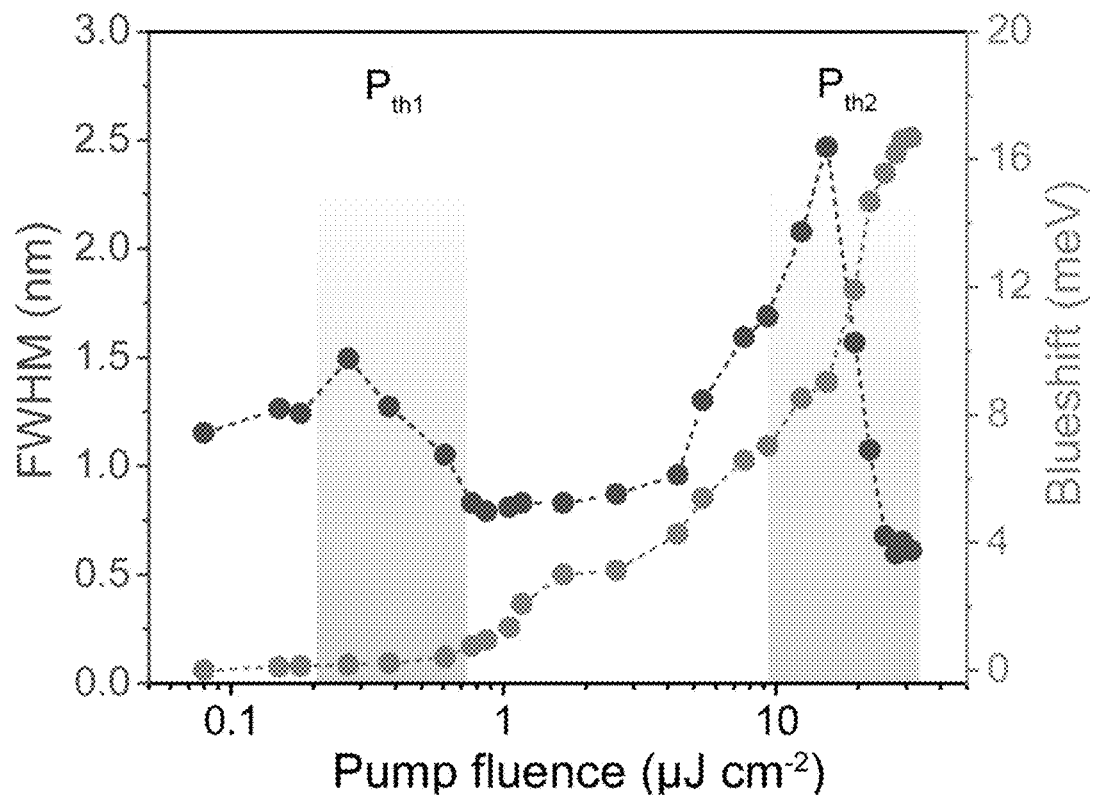
FIG. 3B is a FWHM and wavelength blueshift as a function of pump fluence, showing significant changes at two thresholds, wherein the shaded area represents the region around the threshold.
Figure 3C:
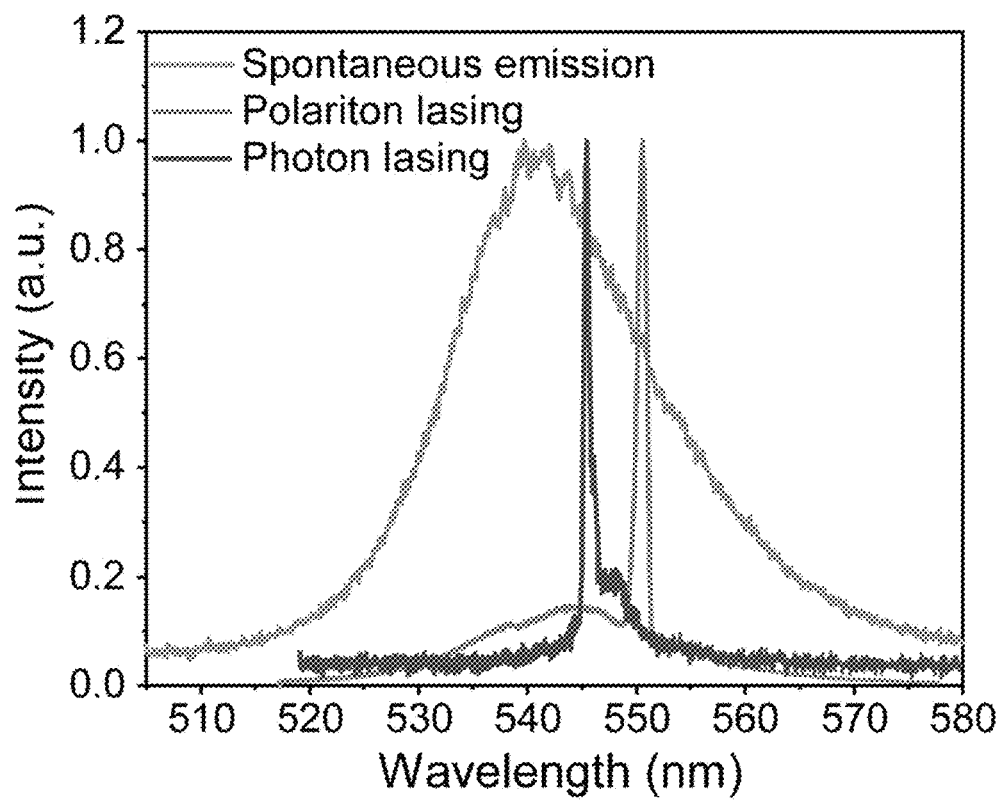
FIG. 3C is spontaneous emission, polariton lasing, and photon lasing spectra of the single crystal perovskite; and the polariton lasing spectrum shows a blueshift compared to the photon laser.
Figure 3D:
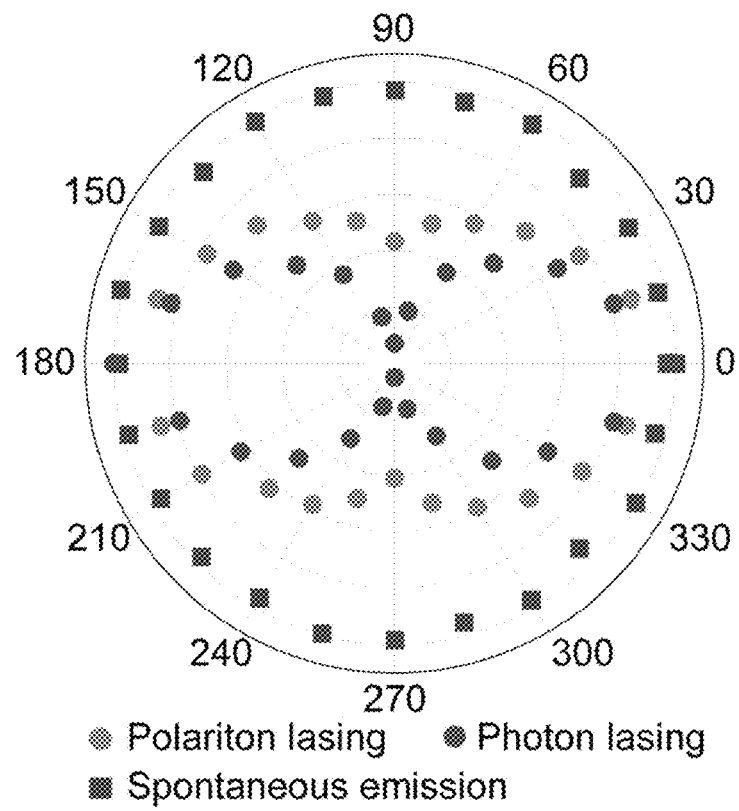
FIG. 3D is a polarization characteristics of spontaneous emission, polariton lasing, and photon lasing; both exciton polariton lasing and photon lasing exhibit significant polarization characteristics, with photon lasers showing stronger polarization.
Figure 3E:
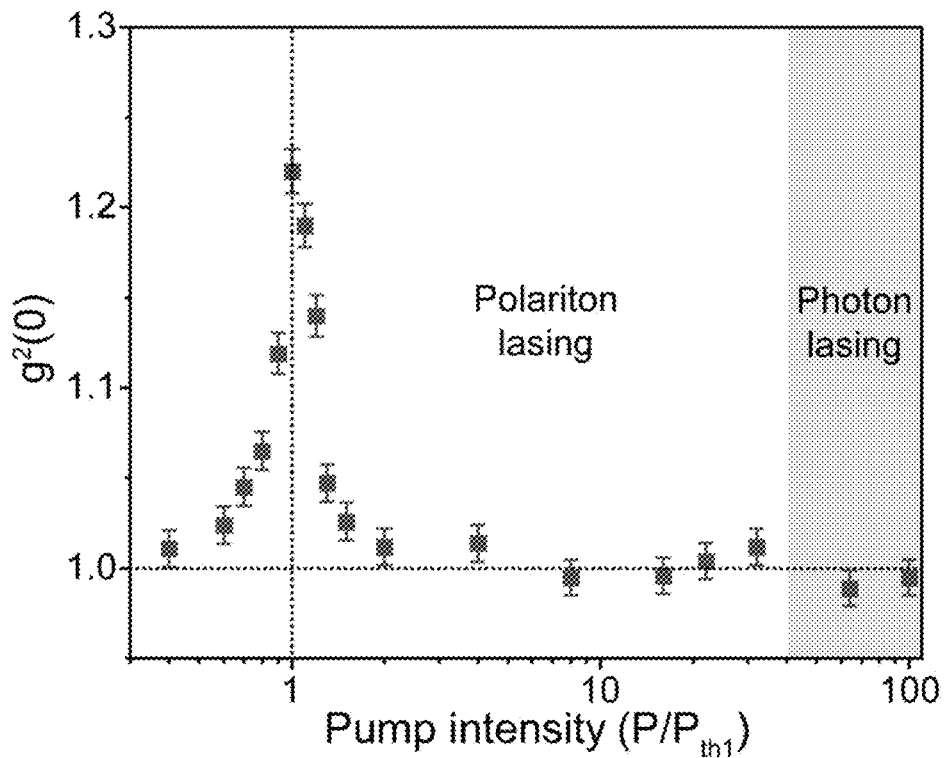
FIG. 3E is a second-order coherence function $g^2(0)$ for exciton polariton lasing and photon lasing, wherein the gray shaded area represents the photon laser state.
Figure 3F:
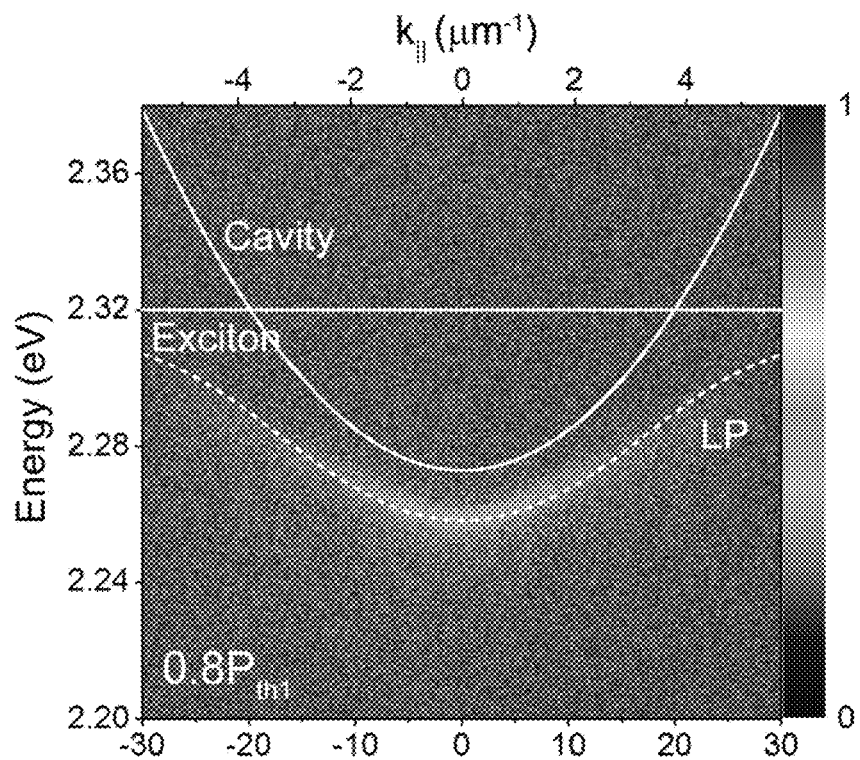
FIG. 3F is an angle-resolved emission spectrum of the single crystal perovskite microcavity at a pump fluence of $P=0.8Pth_1$.
Figure 3G:
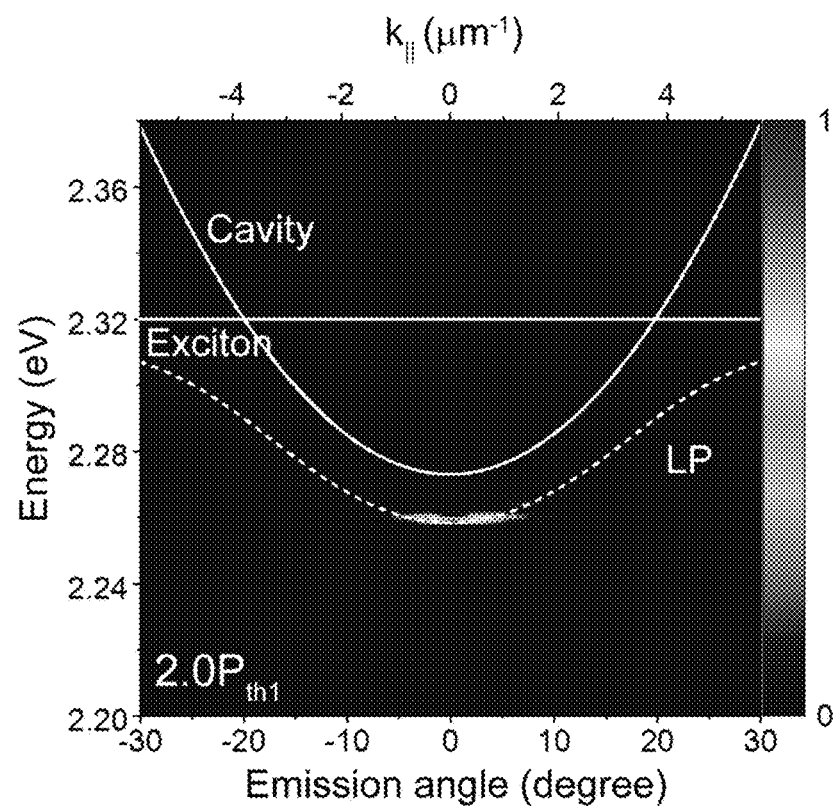
FIG. 3G is an angle-resolved emission spectrum of the single crystal perovskite microcavity at a pump fluence of $P=2Pth_1$.
Figure 3H:
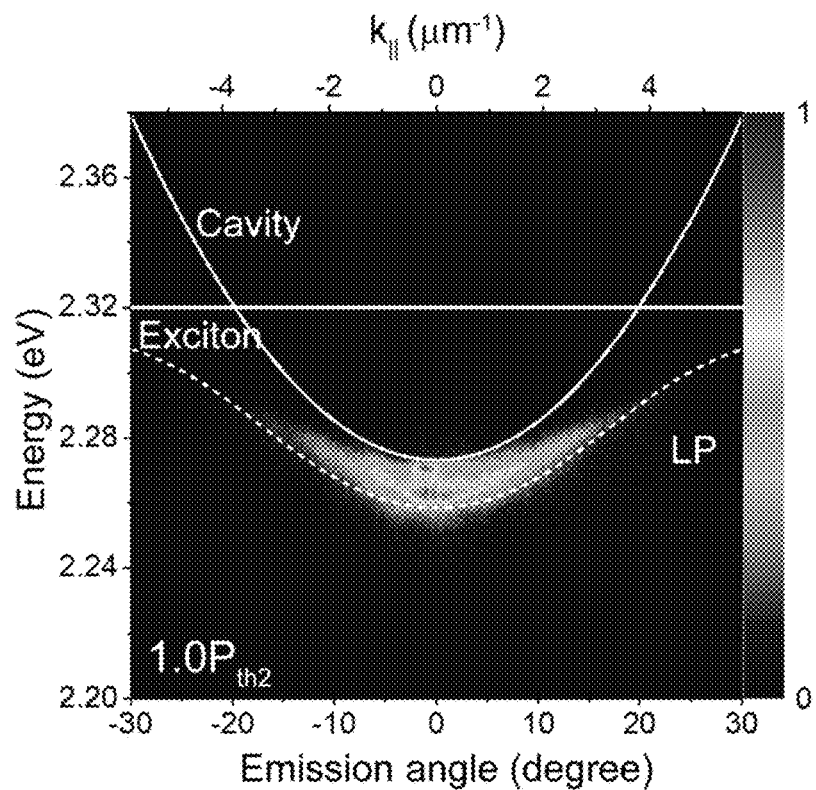
FIG. 3H is an angle-resolved emission spectrum of the single crystal perovskite microcavity at a pump fluence of $P=1.0Pth_2$.
Figure 3I:
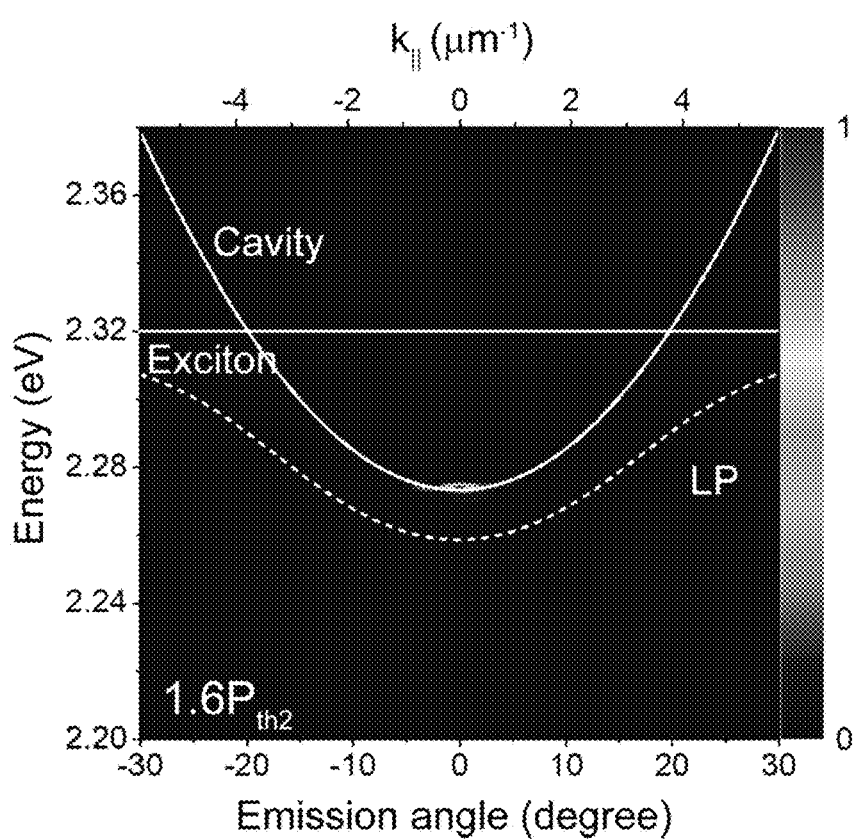
FIG. 3I is an angle-resolved emission spectrum of the single crystal perovskite microcavity at a pump fluence of $P=1.6Pth_2$.

FIGS. 3A to 3I shows the evolution process of polariton lasing to photon lasing in the single crystal perovskite microcavity. FIG. 3A is a curve of emission intensity vs. pump fluence for the single crystal perovskite microcavity; showing two thresholds at pump fluence of 0.3 $\mu J\ cm^{-2}$ and 12.4 $\mu J\ cm^{-2}$ corresponding to polariton lasing and photon lasing, respectively; and the sample was pumped using a 400 nm fs laser (pulse width is 270 fs, repetition rate is 50 kHz). FIG. 3B is a FWHM and wavelength blueshift as a function of pump fluence, showing significant changes at two thresholds, wherein the shaded area represents the region around the threshold. FIG. 3C is spontaneous emission, polariton lasing, and photon lasing spectra of the single crystal perovskite; and the polariton laser spectrum shows a blueshift compared to the photon laser. FIG. 3D is polarization characteristics of spontaneous emission, polariton lasing, and photon lasing; both polariton lasing and photon lasing exhibit significant polarization characteristics, with photon lasers showing stronger polarization. FIG. 3E is a second-order coherence function $g^2(0)$ for polariton lasing and photon lasing, wherein the gray shaded area represents the photon lasing state. FIG. 3F is an angle-resolved emission spectra of the single crystal perovskite microcavity at a pump flux of $P=0.8Pth_1$. FIG. 3G is an angle-resolved emission spectra of the single crystal perovskite microcavity at a pump fluence of $P=2Pth_1$. FIG. 3H is an angle-resolved emission spectra of the single crystal perovskite microcavity at a pump fluence of $P=1.0Pth_2$. FIG. 3I is an angle-resolved emission spectra of the single crystal perovskite microcavity at a pump fluence of $P=1.6Pth_2$. $Pth_1$ and $Pth_2$ correspond to polariton lasing and photon lasing thresholds, respectively. It can be seen that in polariton lasing mode, the energy distribution is at the bottom of the polariton branch, while in photon lasing mode, the energy distribution is at the bottom of the cavity mode, with a relatively significant blueshift.

Figure 4A:
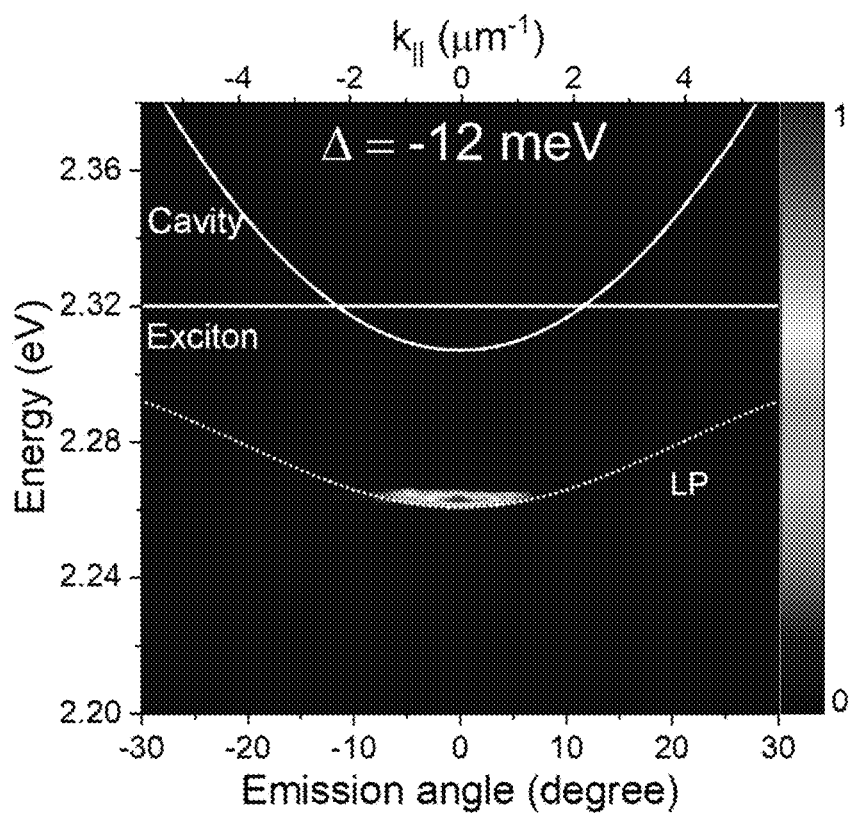
FIG. 4A is an angle-resolved emission spectrum of the single crystal perovskite microcavity at $\Delta=-12$ meV.
Figure 4B:
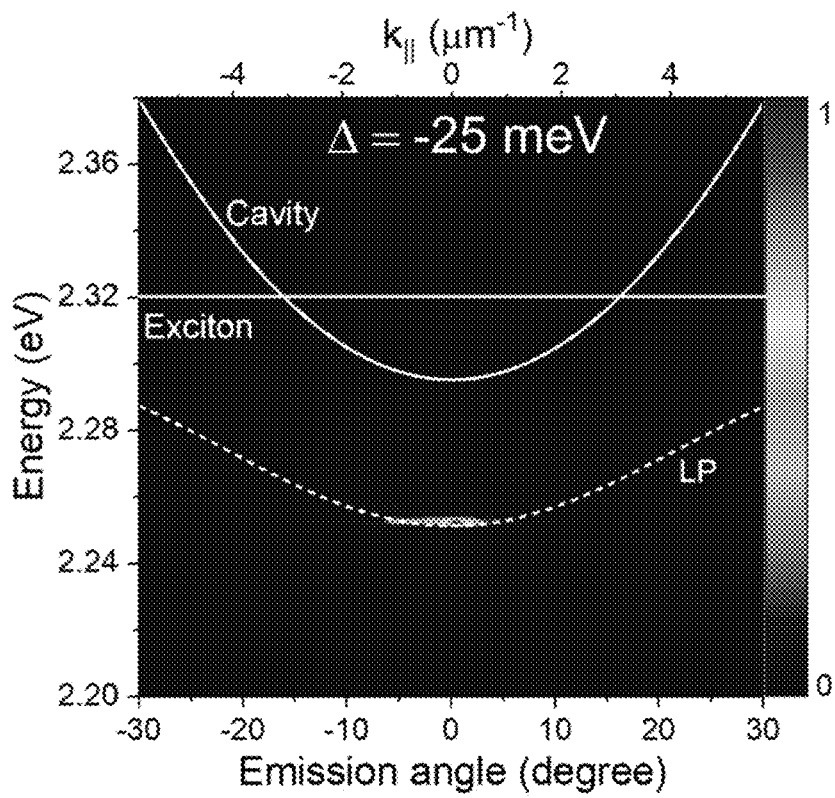
FIG. 4B is an angle-resolved emission spectrum of the single crystal perovskite microcavity at $\Delta=-25$ meV.
Figure 4C:
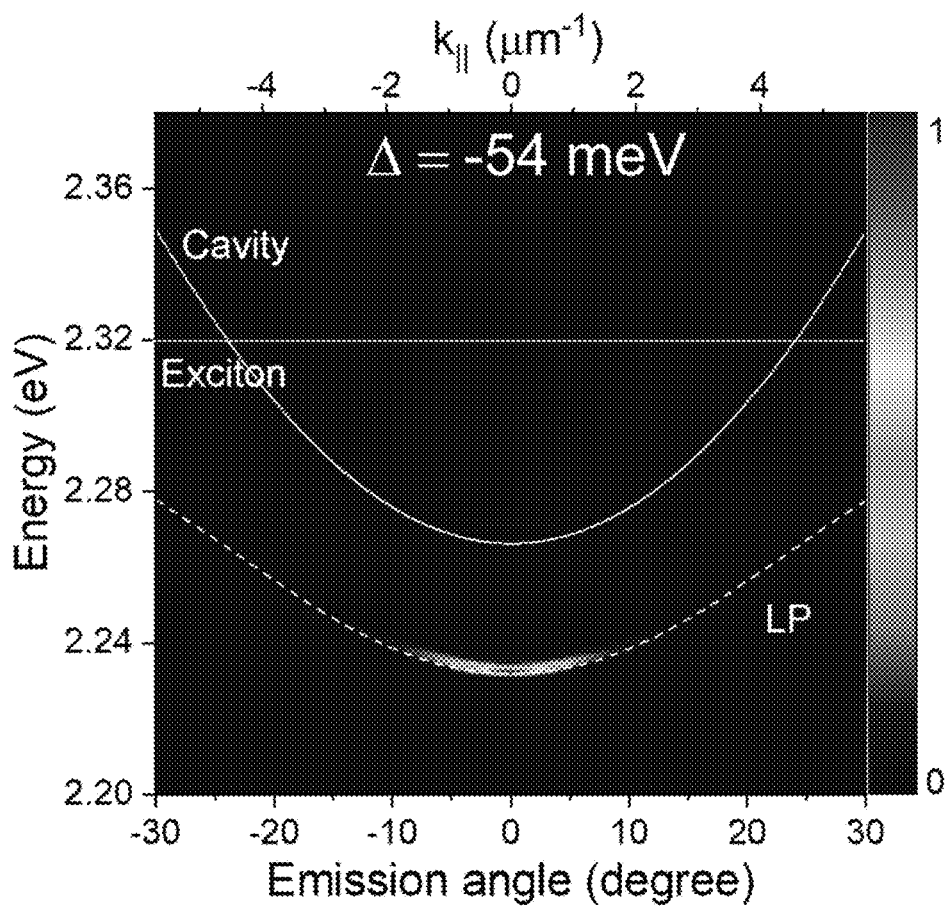
FIG. 4C is an angle-resolved emission spectrum of the single crystal perovskite microcavity at $\Delta=-54$ meV.
Figure 4D:
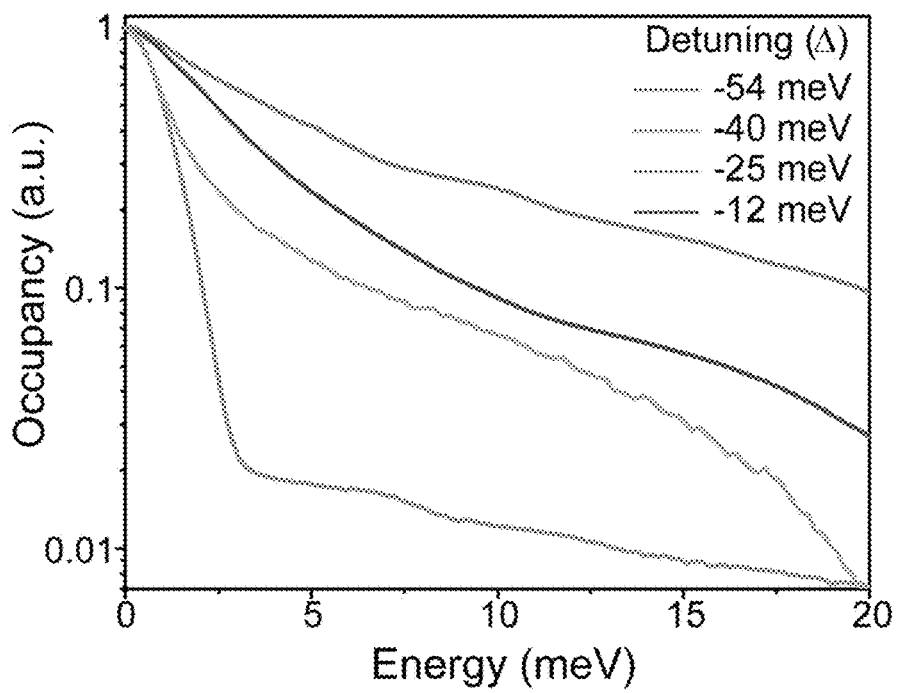
FIG. 4D is polariton occupancy functions for different detuning energies.
Figure 4E:
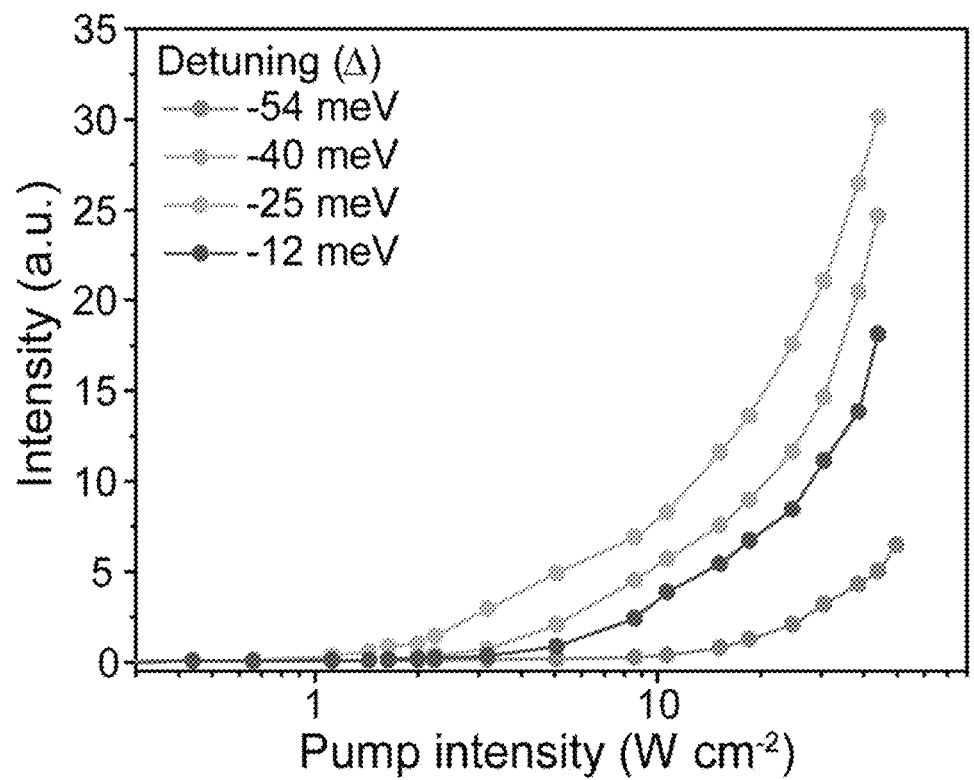
FIG. 4E is emission intensity vs. pump fluence characteristics at detuning energies of $\Delta=-54, -40, -25,$ and $-12$ meV.
Figure 4F:
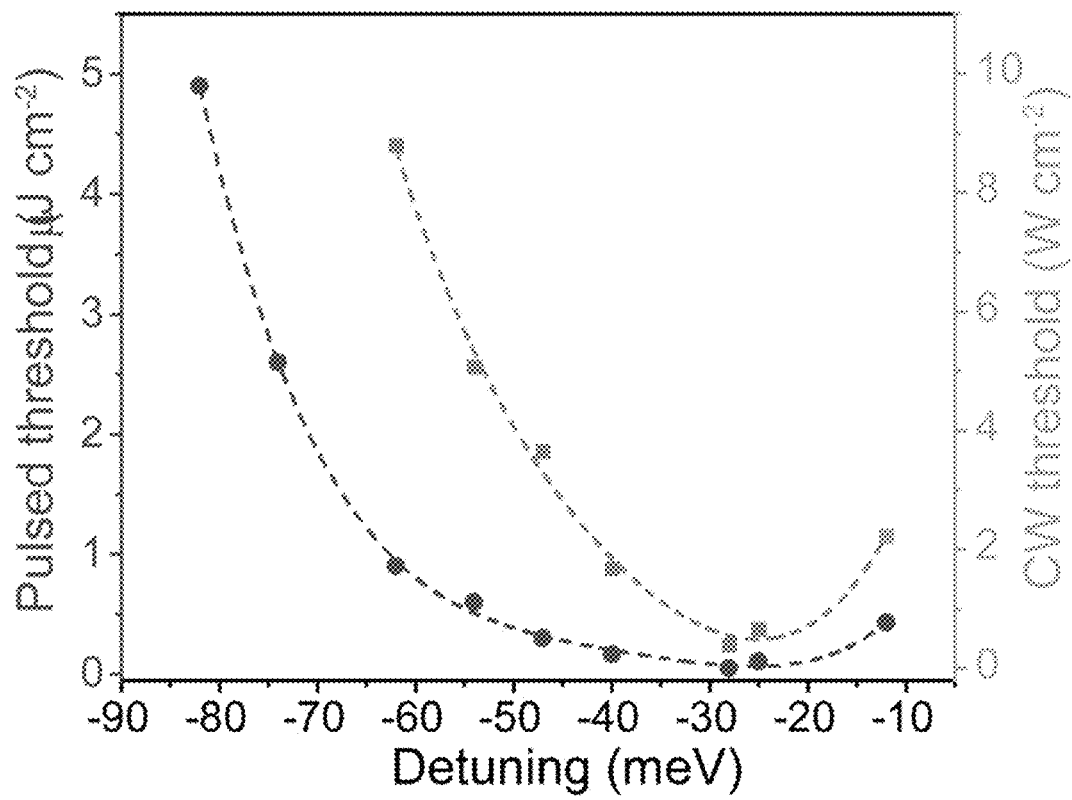
FIG. 4F is a relationship between the lasing threshold and detuning energy.

FIGS. 4A to 4F show the effect of detuning energy on polariton lasing. Detuning energy refers to the energy difference (Δ) between the cavity mode and the exciton mode. Among them, FIGS. 4A, 4B, and 4C represent the angle-resolved emission spectra of single-crystal perovskite microcavities at detuning energies of Δ=−12, Δ=−25, and Δ=−54 meV, respectively. FIG. 4D shows the polariton occupation function at different detuning energies. FIG. 4E presents the emission intensity versus pump fluence characteristics for detuning energies of Δ=−54, −40, −25, and −12 meV. FIG. 4F illustrates a relationship between the lasing threshold and detuning energy. FIG. 4F shows no continuous-wave polariton lasing was observed for detuning energies of Δ<−60 meV and Δ>0 meV (positive detuning energy).

A second embodiment discloses a preparation method of a continuous-wave perovskite polariton laser device, includes the following steps of S1 to S3.

S1, Preparing the optical microcavity. Specifically, S1 includes S11 to S14.

S11, Deposing 10 sets of silica/titanium dioxide ($SiO_2$/$TiO_2$) dielectric layer on a quartz by sputtering method to form the DBR mirror with high reflectivity (>98%); a thickness of $SiO_2$ layer is 91 nm, a thickness of $TiO_2$ layer is 55 nm.

S12, Depositing a periodicity metal pillar array on a distributed bragg reflector (DBR) mirror by a designed mask plate; a diameter of each metal pillar is 1 mm, and a distance between two adjacent metal pillars is 1 mm.

S13, Coating a layer of PMMA on the DBR mirror in a spin-coating manner, to enhance surface hydrophobicity; a concentration of PMMA solution is 5 mg/ml, a rotating speed is 3000 rpm, and after spin-coating process, it is heated at 120° C. for 10 minutes on a hot bench for curing.

S14, Placing another DBR mirror facing down and bonded to the DBR mirror of S13 with the metal pillar array; fixing with clips to form a vertical microcavity structure.

S2, Preparing the perovskite material; and S2 includes S21 to S22.

S21, Dissolving FABr:MABr:$PbBr_2$ with a molar ration of 0.1:0.9:1 in 1 mL of DMF and DMSO mixed solvent to obtain a perovskite precursor solution; and a concention of the perovskite precursor solution is 1 mol $L^{-1}$, a ratio of DMF to DMSO is 4:1.

S22, Adding 5 mg of molecular additive PVP to the perovskite perovskite precursor solution for passivating defects.

S3, Preparing the perovskite laser device. Specifically, S3 includes S31 to S32.

S31, injecting the perovskite precursor solution into the optical microcavity; By utilizing capillary forces, the perovskite precursor solution will diffuse uniformly within the optical microcavity.

S32, Placing the optical microcavity with the perovskite precursor solution on a heating platform to induce a crystallization of a perovskite single crystal during a heating process. Slowly increase the temperature from 30° C. to 80° C. at a rate of 2° C. per hour. After reaching 80° C., continuously heating for 24 hours. After the hot stage temperature gradually cools down to room temperature, taking the optical microcavity out from the heater and obtaining the continuous-wave perovskite polariton laser device.

S4, Adjusting and testing the continuous-wave perovskite polariton laser device.

Attaching a commercial GaN LED chip to a bottom of the continuous-wave perovskite polariton laser device using epoxy resin.

Driving the GaN LED with a DC current source and collecting the light emitted from the top of the continuous-wave perovskite polariton laser device into a spectrometer to measure the spectrum; and placing a long-pass filter (>500 nm) in front of the spectrometer to filter the pump light.

Figure 5A:
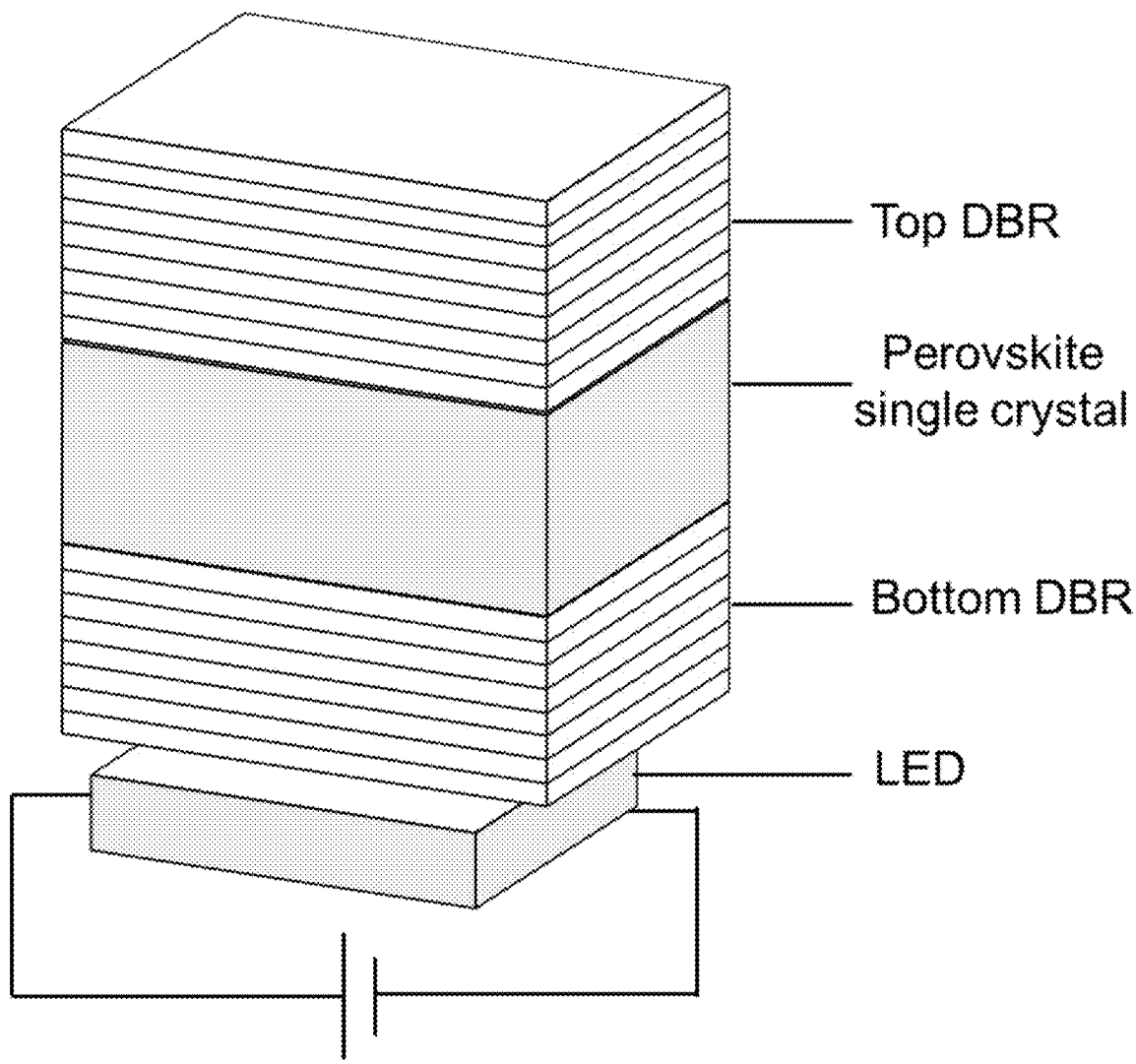
FIG. 5A is a schematic of the electrically-driven perovskite laser chip.
Figure 5B:
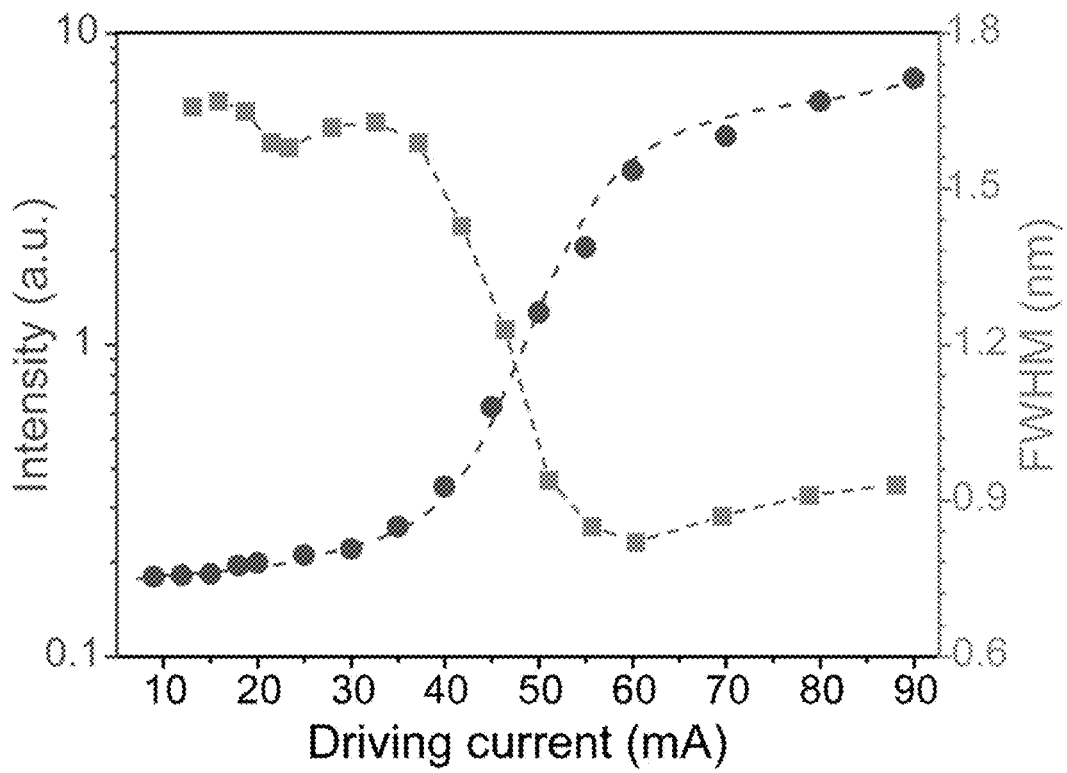
FIG. 5B is an emission intensity and spectral FWHM of the perovskite polariton laser chip as a function of the DC driving current of the GaN LED.
Figure 5C:
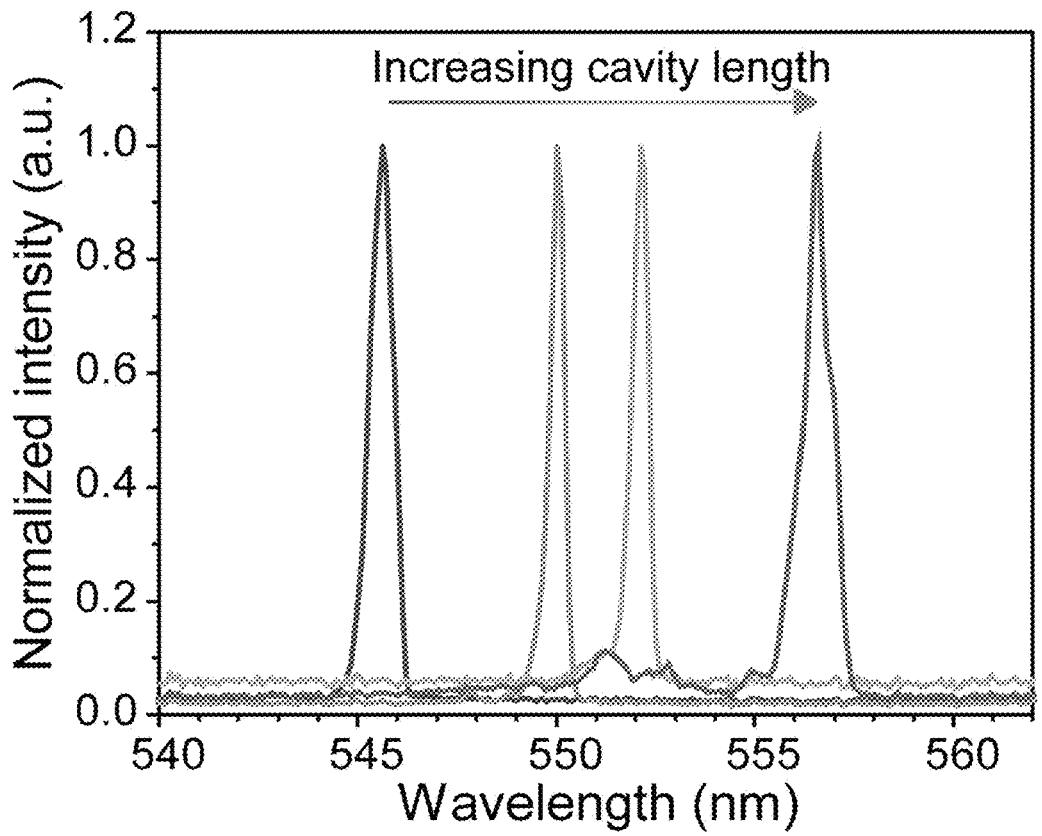
FIG. 5C is lasing spectra for microcavity of different lengths.

FIGS. 5A to 5C shows the preparation and effect diagram of an electrically pumped laser chip. FIG. 5A—is a schematic of the current-injection perovskite laser chip, powered by a DC current source to drive the 450 nm GaN LED. FIG. 5B is an emission intensity and spectral FWHM of the perovskite polariton laser chip as a function of the DC driving current of the GaN LED; a clear increase in emission intensity is observed near the current threshold; the spectral FWHM also sharply decreases from 1.8 nm to 0.8 nm, confirming the occurrence of lasing. FIG. 5C is laser spectra for microcavity of different lengths (adjusted by single crystal thickness); at a driving current of 60 mA, tunable laser wavelengths from 545 to 557 nm are achieved.

A third embodiment discloses a preparation method of a continuous-wave perovskite polariton laser device, includes the following steps of S1 to S3.

S1, Preparing the optical microcavity. Specifically, S1 includes S11 to S14.

S11, Depositing ten set of $SiO_2$/$TiO_2$ dielectric layers on a quartz by sputtering method to form the DBR mirror with high reflectivity (>98%) in the near-infrared region; a thickness of $SiO_2$ layer is 130 nm, a thickness of $TiO_2$ layer is 78 nm.

S12, Depositing a periodicity metal pillar array on a distributed bragg reflector (DBR) mirror by hot evaporation method; a diameter of each metal pillar is 1 mm, and a distance between two adjacent metal pillars is 1 mm.

S13, Coating a layer of PMMA on the DBR mirror in a spin-coating manner, to enhance surface hydrophobicity; a concentration of PMMA solution is 5 mg/ml, a rotating speed is 3000 rpm, and after spin-coating process, it is heated at 120° C. for 10 minutes on a hot bench for curing.

S14, Placing another DBR mirror facing down and bonded to the DBR mirror of S13 with the metal pillar array; fixing with clips to form a vertical microcavity structure.

S2, Preparing the perovskite material; and S2 includes S21 to S22.

S21, Dissolving FAI:MAI:$PbI_2$ with a molar ration of 0.1:0.9:1 in 1 mL of DMF and DMSO mixed solvent to obtain a perovskite precursor solution; and a concentration of the perovskite precursor solution is 1 mol $L^{-1}$, a ratio of DMF to DMSO is 4:1.

S22, Adding 5 mg of molecular additive PVP to the perovskite precursor solution for passivating defects.

S3, Preparing the perovskite laser device. Specifically, S3 includes S31 to S32.

S31, injecting the perovskite precursor solution into the optical microcavity; By utilizing capillary forces, the perovskite precursor solution will diffuse uniformly within the optical microcavity.

S32, Placing the optical microcavity with the perovskite precursor solution on a heating platform to induce a crystallization of a perovskite single crystal during a heating process. Slowly increase the temperature from 30° C. to 120° C. at a rate of 3° C. per hour. After reaching 120° C., continuously heating for 24 hours. After the hot stage temperature gradually cools down to room temperature, taking the optical microcavity out from the heater and obtaining the continuous-wave perovskite polariton laser device.

S4, Adjusting and testing the continuous-wave perovskite polariton laser device.

Placing the continuous-wave perovskite polariton laser device on an inverted microscope platform and focusing a continuous-wave laser with a wavelength of 532 nm through a 100× lens onto the gain medium layer of the perovskite polariton laser device; and placing a rotary attenuation filter in front of the objective lens to adjust the excitation intensity Controlling the continuous-wave perovskite polariton laser device to emit laser beam, the laser beam generated by the continuous-wave perovskite polariton laser device passes through the microscope objective and then through a 4f system, and then directing the laser beam into a slit entrance of an imaging spectrometer to measure its angle-resolved spectrum.

Placing a polarizer in front of the imaging spectrometer, and the angle of the polarizer is rotated to measure a polarization of the laser beam.

Adopting a beam splitter to split the laser beam from the continuous-wave perovskite polariton laser device into two paths; and directing each path into a fiber-coupled single-photon detector to measure a temporal and a spatial coherence of the laser beam.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A continuous-wave perovskite polariton laser device, comprising an optical microcavity, a spacer layer, and a gain medium, wherein the continuous-wave perovskite polariton laser device is prepared by the following steps:

S1, preparing the optical microcavity;
wherein, S1 comprises the following steps: depositing a metal pillar array on a distributed bragg reflector (DBR) mirror, with a height of each metal pillar ranging from 10 nm to 1 mm; placing another DBR mirror facing down and bonded to the DBR mirror with the metal pillar array; applying a pressure to press them together to form a vertical microcavity surface-emitting laser (VCSEL) structure; and S2, preparing the perovskite material;
wherein, S2 comprises the following steps: dissolving A'X, AX, $BX_2$, and a molecular additive selected from polymethyl methacrylate (PMMA), polyethylene glycol (PEG), poly (ethylene oxide) (PEO), or polyvinylpyrrolidone (PVP); the small molecule is potassium bromide (KBr), potassium thiocyanate (KSCN), or guanidine thiocyanate (GASCN); and the oxide is NiOx, ZnO, and $SnO_2$ in a solvent to obtain a perovskite precursor solution; and preparing the perovskite material by solution process; wherein A' is organic amine ion, A is monovalent cation, B is divalent metal cation, and X is anion; and S3, preparing the perovskite laser device;
wherein, S3 comprises the following steps: injecting the perovskite precursor solution into the optical microcavity; placing the optical microcavity with the perovskite precursor solution on a heating platform to induce a crystallization of a perovskite single crystal during a heating process, allowing in-situ growth of the perovskite single crystal, and obtaining the continuous-wave perovskite polariton laser device;

wherein the continuous-wave perovskite polariton laser device is operated in continuous-wave pumping mode, and a working principle is polariton condensation emission, a lasing threshold is 0.4 W $cm^{-2}$; the gain medium is the perovskite material, which is uniformly distributed within the microcavity.

2. The continuous-wave perovskite polariton laser device according claim 1, wherein, a component of the perovskite material is $A'_2A_{n-1}B_nX_{3n+1}$ or $ABX_3$, wherein n is a positive integer;

wherein, A' is consisted of one or more of phenylethylamine ($PEA^+$), butylamine ($BA^+$), and ethylamine ($EA^+$); A is consisted of one or more of cesium ion ($Cs^+$), methylammonium ion ($MA^+$), formamidinium ion ($FA^+$), ethylamine ion ($EA^+$), guanidinium ion ($GA^+$), and isopropylamine ion ($IPA^+$); B is consisted of one or more of lead ion ($Pb2^+$), tin ion ($Sn2^+$), germanium ion ($Ge2^+$), indium ion ($In2^+$), and bismuth ion ($Bi2^+$); and X comprises one or more of chloride ion ($Cl^-$), bromide ion ($Br^-$), and iodide ion ($I^-$).

3. The continuous-wave perovskite polariton laser device according claim 1, wherein, before the step of depositing a metal pillar array on a distributed bragg reflector (DBR) mirror, S1 also comprises:

depositing multilayer dielectric layers of silica/titanium dioxide ($SiO_2/TiO_2$) on a quartz, a sapphire, or a flexible polyethylene terephthalate (PET) substrate by sputtering or electron-beam evaporation to form the DBR mirror;

wherein a thickness of each dielectric layer is $\lambda/4n$, where $\lambda$ is an emission wavelength of the gain medium, and n is a refractive index of the dielectric material.

4. The continuous-wave perovskite polariton laser device according claim 1, wherein, the solvent in S2 is consisted of one or more of dimethyl fumarate (DMF).

5. A continuous-wave perovskite polariton laser chip, comprising a continuous-wave perovskite polariton laser device configured to emit laser radiation under continuous optical or electrical excitation, an electrically driven light source, and a power supply, wherein continuous-wave perovskite polariton laser device comprises an optical microcavity including a pair of DBR mirrors, a spacer layer defining a cavity length of 100 nm to 10 μm, and a gain medium having a thickness of 10 nm to 1 mm;

wherein, the optical microcavity being fixed to the electrically driven light source; the electrically driven light source being served as a pump of the optical microcavity; and the power supply being connected to the electrically driven light source to drive the light source to emit excitation light.

6. The continuous-wave perovskite polariton laser chip of claim 5, wherein, the optical microcavity is fixed to the electrically driven light source by bonding, gluing, welding, coating, or photolithography, with the electrically driven light source serving as the pump for the optical microcavity.

* * * * *